US007877735B2

(12) United States Patent
Todorova et al.

(10) Patent No.: US 7,877,735 B2
(45) Date of Patent: Jan. 25, 2011

(54) APPLICATION CLONING

(75) Inventors: Mariela T. Todorova, Pleven (BG); Monika M. Kovachka-Dimitrova, Sofia (BG)

(73) Assignee: SAP AG, Walldorf (DE)

( * ) Notice: Subject to any disclaimer, the term of this patent is extended or adjusted under 35 U.S.C. 154(b) by 1297 days.

(21) Appl. No.: 10/854,449

(22) Filed: May 25, 2004

(65) Prior Publication Data

US 2005/0278338 A1 Dec. 15, 2005

(51) Int. Cl.
*G06F 9/44* (2006.01)
*G06F 9/445* (2006.01)

(52) U.S. Cl. .................. 717/131; 717/169; 717/175

(58) Field of Classification Search ................ None
See application file for complete search history.

(56) References Cited

U.S. PATENT DOCUMENTS

| | | | |
|---|---|---|---|
| 5,596,714 A * | 1/1997 | Connell ................ 714/38 |
| 5,999,972 A | 12/1999 | Gish |
| 6,253,282 B1 | 6/2001 | Gish |
| 6,266,709 B1 | 7/2001 | Gish |
| 6,272,555 B1 | 8/2001 | Gish |
| 6,272,556 B1 | 8/2001 | Gish |
| 6,304,893 B1 | 10/2001 | Gish |
| 6,424,991 B1 | 7/2002 | Gish |
| 6,434,598 B1 | 8/2002 | Gish |
| 6,604,209 B1 | 8/2003 | Grucci et al. |
| 6,643,650 B1 | 11/2003 | Slaughter et al. |
| 6,725,453 B1 * | 4/2004 | Lucas et al. ............... 717/178 |
| 6,745,387 B1 | 6/2004 | Ng et al. |
| 6,766,477 B2 | 7/2004 | Grucci et al. |
| 6,801,940 B1 * | 10/2004 | Moran et al. ............... 709/224 |
| 6,832,238 B1 | 12/2004 | Sharma et al. |
| 6,996,588 B2 * | 2/2006 | Azagury et al. ............ 707/204 |
| 7,076,798 B2 | 7/2006 | Chang et al. |
| 7,080,092 B2 | 7/2006 | Upton |
| 7,089,584 B1 | 8/2006 | Sharma |
| 7,150,015 B2 | 12/2006 | Pace et al. |
| 7,159,224 B2 | 1/2007 | Sharma et al. |
| 7,167,914 B2 | 1/2007 | Cohen et al. |
| 7,171,478 B2 | 1/2007 | Lueckhoff et al. |
| 7,246,358 B2 | 7/2007 | Chinnici et al. |
| 2001/0011265 A1 | 8/2001 | Cuan et al. |
| 2002/0178254 A1 | 11/2002 | Brittenham et al. |
| 2002/0188538 A1 | 12/2002 | Robertson et al. |
| 2002/0188869 A1 | 12/2002 | Patrick |
| 2003/0018694 A1 | 1/2003 | Chen et al. |

(Continued)

OTHER PUBLICATIONS

""Dreamweaver MX 2004 Using Dreamweaver"", *Macromedia*, Published: Sep. 10, 2003, Chapter 2, pp. 1, 2, 59-61.

(Continued)

*Primary Examiner*—Tuan Q Dam
*Assistant Examiner*—Evral Bodden
(74) *Attorney, Agent, or Firm*—Blakley, Sokoloff, Taylor & Zafman LLP

(57) ABSTRACT

A system and method are described for performing application cloning. In one embodiment, on a client, an application that is already deployed on a server is accessed and then cloned into another application by assigning a new name to the application. The clone application is then deployed on the server where the application and the clone application are simultaneously run.

16 Claims, 25 Drawing Sheets

U.S. PATENT DOCUMENTS

| | | |
|---|---|---|
| 2003/0018832 A1 | 1/2003 | Amirisetty et al. |
| 2003/0046639 A1 | 3/2003 | Fai et al. |
| 2003/0050932 A1 | 3/2003 | Pace et al. |
| 2003/0061247 A1 | 3/2003 | Renaud |
| 2003/0093402 A1 | 5/2003 | Upton et al. |
| 2003/0154266 A1 | 8/2003 | Bobick et al. |
| 2003/0191803 A1 | 10/2003 | Chinnici et al. |
| 2003/0204645 A1 | 10/2003 | Sharma et al. |
| 2003/0236923 A1 | 12/2003 | Jeyaraman et al. |
| 2004/0068731 A1* | 4/2004 | Davis et al. .................. 719/310 |
| 2004/0078495 A1 | 4/2004 | Mousseau et al. |
| 2004/0078719 A1 | 4/2004 | Grucci et al. |
| 2004/0139154 A1 | 7/2004 | Schwarze |
| 2004/0148183 A1 | 7/2004 | Sadiq |
| 2004/0148370 A1 | 7/2004 | Sadiq |
| 2004/0148588 A1 | 7/2004 | Sadiq |
| 2004/0205101 A1 | 10/2004 | Radhakrishnan |
| 2005/0049938 A1 | 3/2005 | Venkiteswaran |
| 2005/0080801 A1 | 4/2005 | Kothandaraman et al. |
| 2005/0097178 A1 | 5/2005 | Bala |
| 2005/0165910 A1 | 7/2005 | Kilian |
| 2005/0262189 A1 | 11/2005 | Mamou et al. |
| 2005/0262477 A1 | 11/2005 | Kovachka-Dimitrova et al. |
| 2005/0278274 A1* | 12/2005 | Kovachka-Dimitrova et al. ........................... 707/1 |
| 2007/0033088 A1 | 2/2007 | Aigner et al. |

OTHER PUBLICATIONS

Kooijmans, Alex L., et al., "Enterprise JavaBeans for z/OS and OS/390 WebSphere Application Server 4.0", *IBM Corporation: International Technical Support Organization,*, pp. i-iiii, v-xvi and 61-132, (Dec. 2001), Chapter 5-7.

Orfali, Robert, "Client/Server Programming with JAVA and CORBA Second Edition", *by Robert Orfali et al*, pp. cover page, title page, copyright page, 1-25, 27-31, 33-35, 37, 39-45, 47, 49-51, 53-67, 69, 71-91, 93, 95, 97-99, 101-109, 111, 113-115, 117, 119-123, 125, 127, 129, 131, 133, 135, 137, 139-141, 143-147, 149-151, 153-157, 159-161, 163, 165, 167-169, (1998).

Non-Final Office Action for U.S. Appl. No. 10/852,893, Mailed Dec. 31, 2008, 11 pages.

Final Office Action for U.S. Appl. No. 10/853,374, Mailed Jan. 28, 2009, 13 pages.

Final Office Action for U.S. Appl. No. 10/854,729, Mailed Mar. 5, 2009, 12 pages.

Non-Final Office Action for U.S. Appl. No. 10/854,455; dated Jun. 9, 2009; 10 pages.

Final Office Action for U.S. Appl. No. 10/853,067 dated Jun. 9, 2009; 27 pages.

Non-Final Office Action for U.S. Appl. No. 10/854,729, Mailed Jun. 18, 2009, 9 pages.

Office Action for U.S. Appl. No. 10/853,374, Mailed Jun. 25, 2009, 10 pages.

* cited by examiner

APPLICATION CLONING

BACKGROUND

1. Field of the Invention

This invention relates generally to the field of application deployment. More particularly, an embodiment relates to a system and method for performing application cloning.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft NET standard and/or the Advanced Business Application Programming (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. J2EE engine 130 is currently used in many large-scale application development and deployment projects for these reasons.

However, as application development projects grow larger and are diversified, deployment of applications becomes increasingly important. For example, it is useful to have an improved deployment service and management including a variety of containers, application interfaces, transaction management and modules, notification and information status systems, file updates, application updates and duplications, partial application deployments, resource pooling, and security checks.

SUMMARY

A system and method are described for performing application cloning. In one embodiment, on a client, an application that is already deployed on a server is accessed and then cloned into another application by assigning a new application name to the application. The cloned application is then deployed on the server where the application and the clone application are simultaneously run to perform performance tests, as the server regards the application and the clone application as two distinct applications. In one embodiment, the application is also assigned a new Web alias along with the new application name. Furthermore, each of the application and the clone application may be cloned into multiple clone applications. In another embodiment, the clone application is deployed on the server to overwrite the application.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
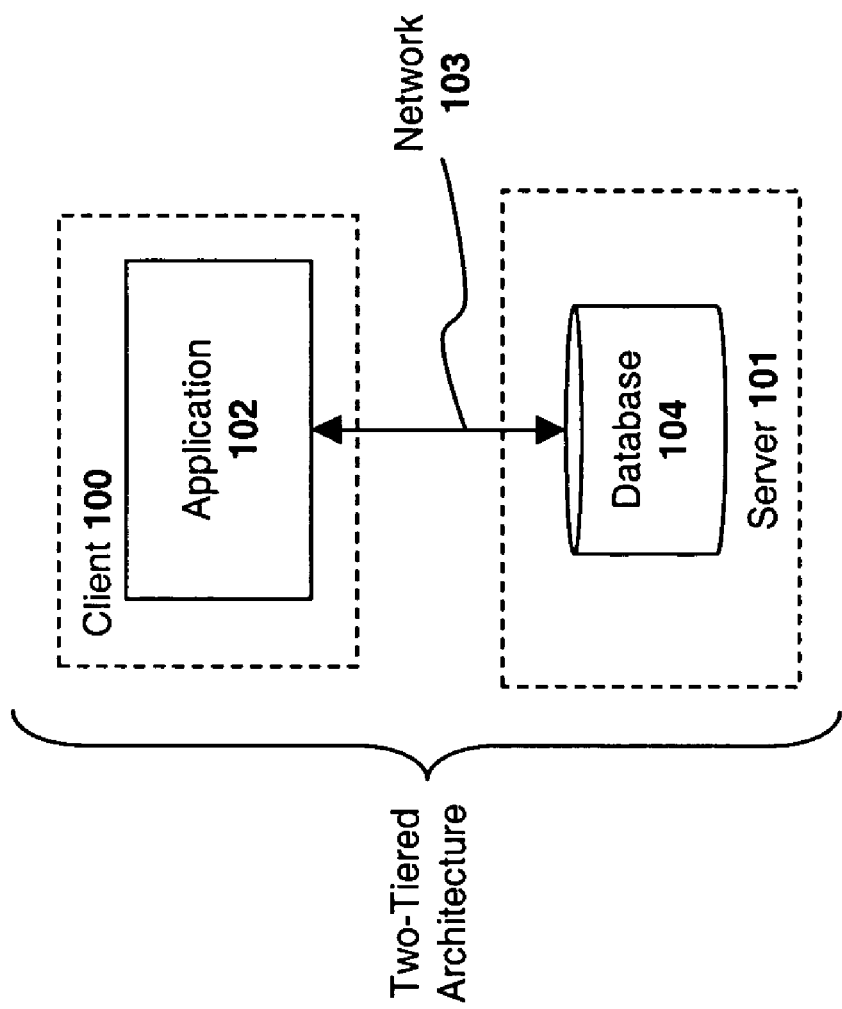
FIG. 1A is a block diagram illustrating a prior art two-tier client-server architecture.
Figure 1B:
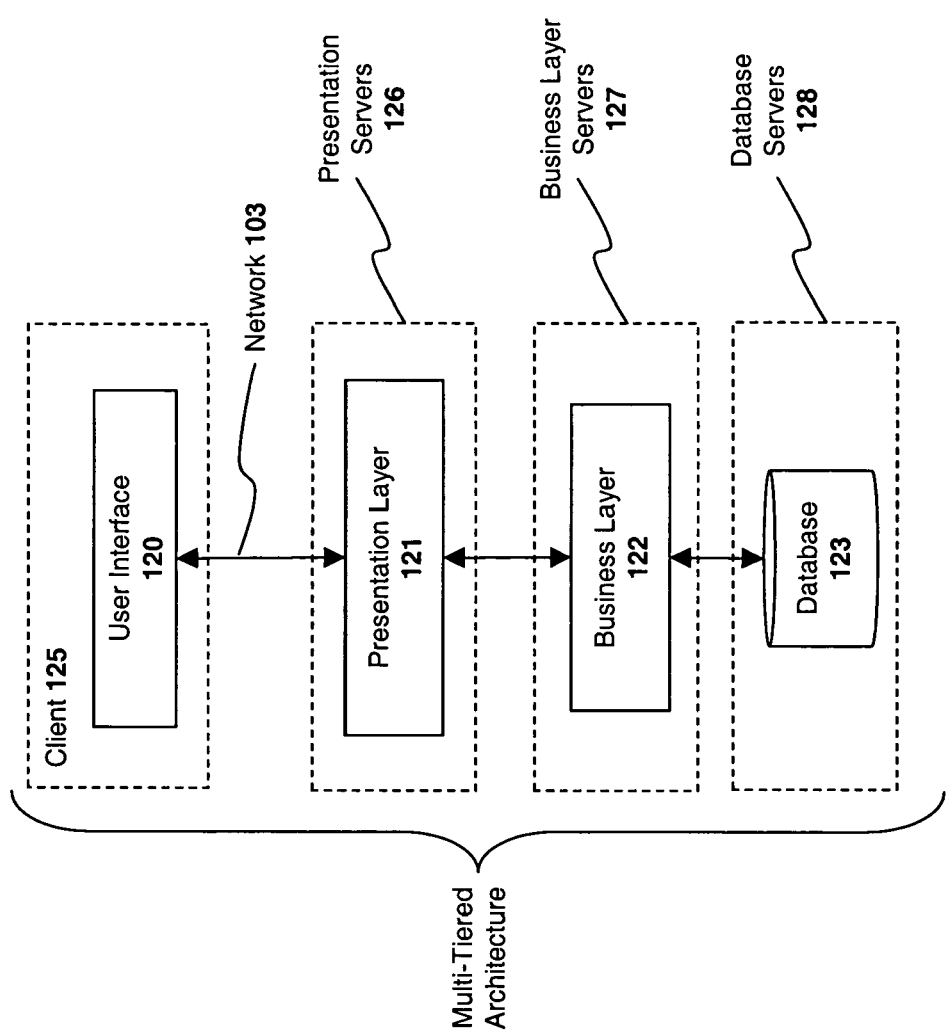
FIG. 1B is a block diagram illustrating a prior art multi-tier client-server architecture.
Figure 1C:
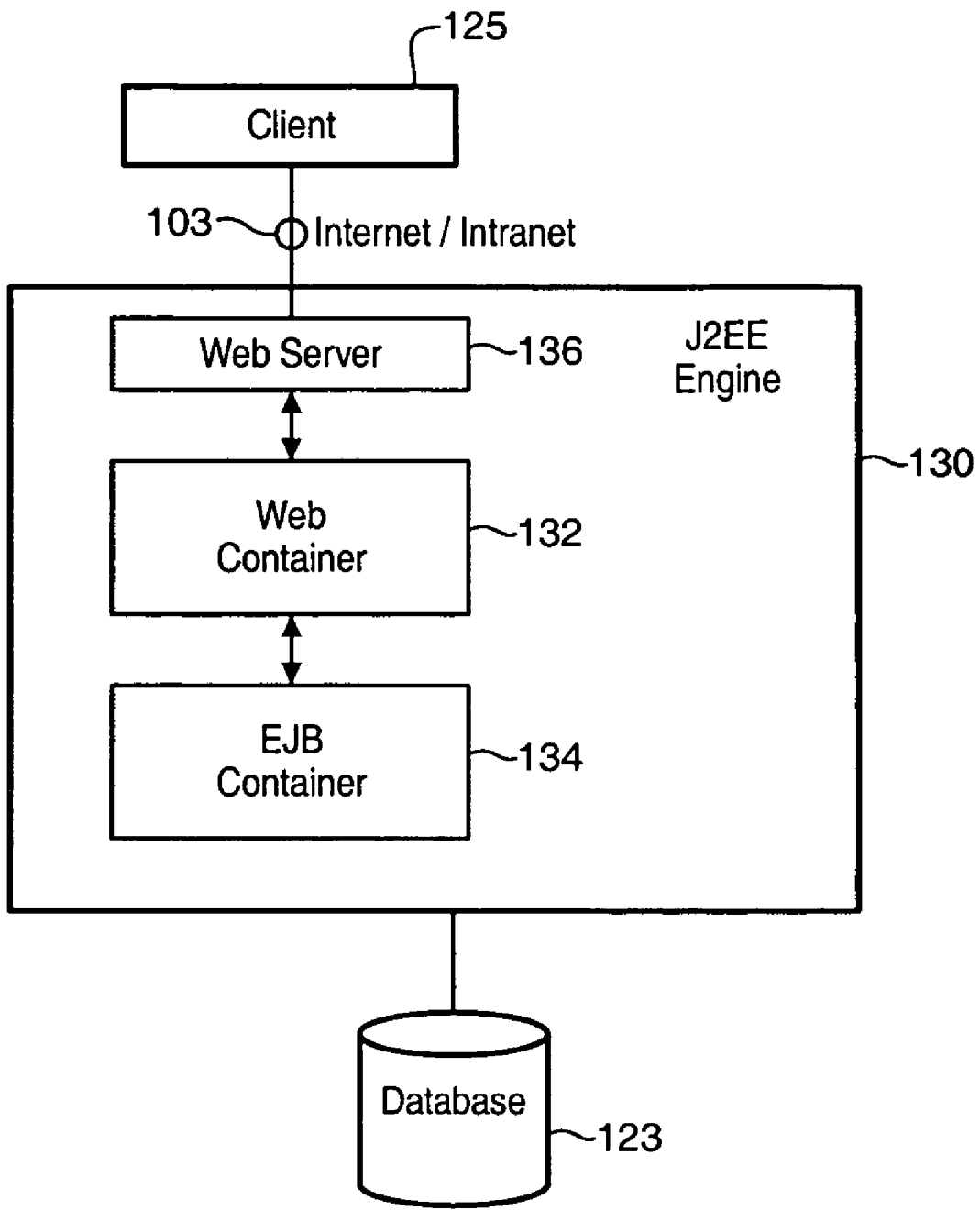
FIG. 1C is a block diagram illustrating a prior art J2EE environment.

Described below is a system and method for application cloning. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
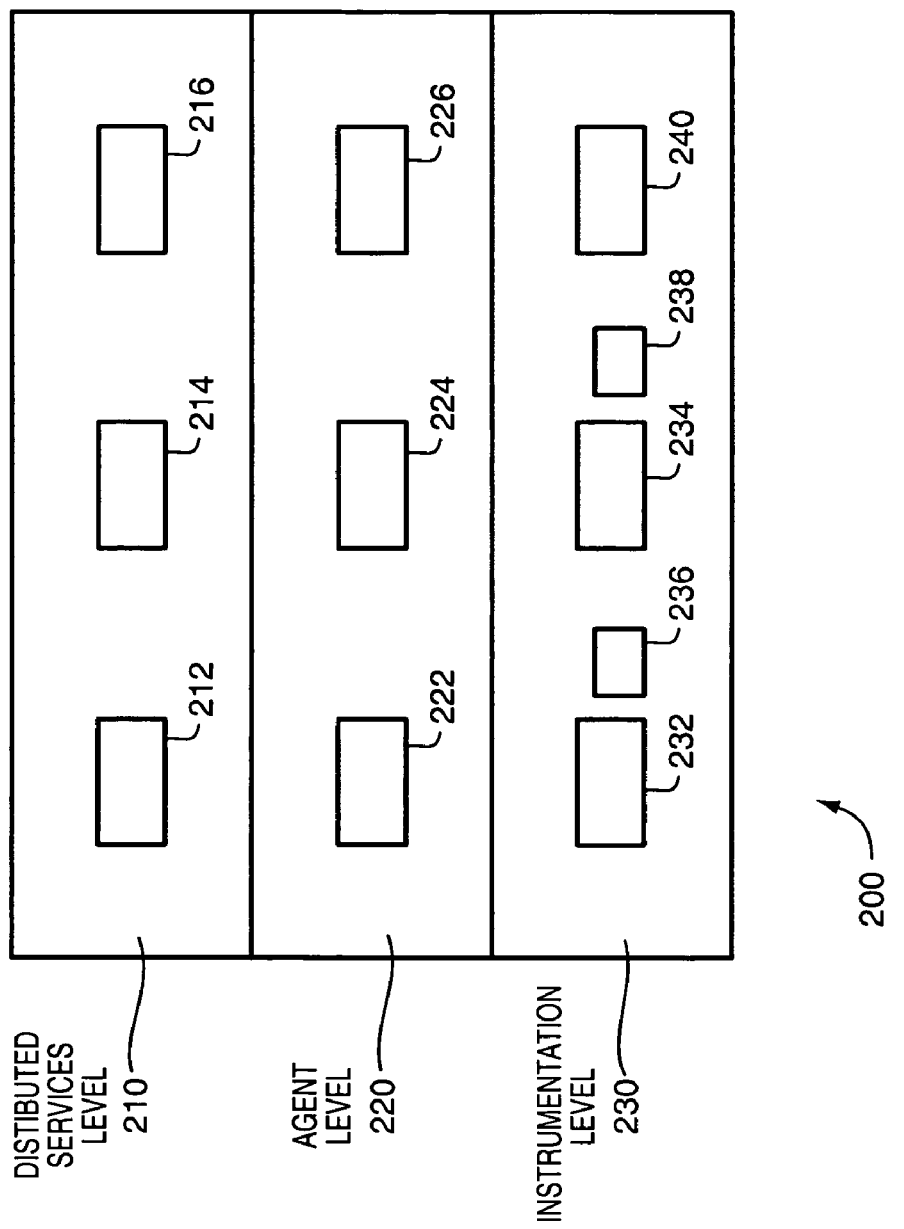
FIG. 2 is a block diagram illustrating an embodiment of Java management architecture (JMA) in which embodiments of the present invention may be implemented.

FIG. 2 is a block diagram illustrating an embodiment of Java management architecture (JMA) 200 in which embodiments of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 12-13. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems (DBMS) 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
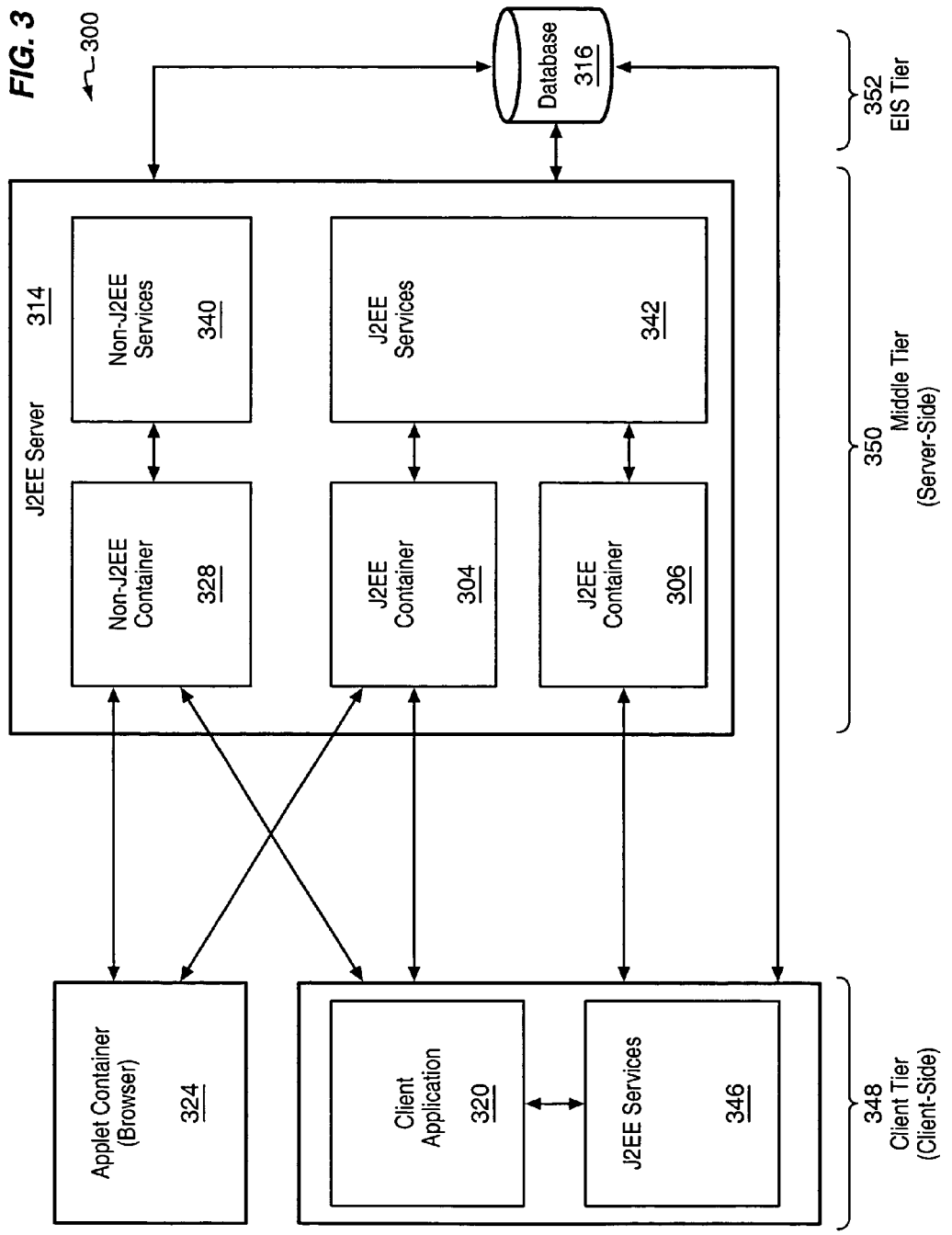
FIG. 3 is a block diagram illustrating an embodiment of a multi-tiered J2EE architecture having a J2EE server employing J2EE and non-J2EE containers and services.

FIG. 3 is a block diagram illustrating an embodiment of a multi-tiered J2EE architecture 300 having a J2EE server 314 employing J2EE and non-J2EE containers 304-306, 328 and services 340-342. As illustrated, the multi-tiered J2EE architecture 300 includes a J2EE server (or engine) 314 having J2EE containers 304-306 on the server-side, and more particularly, in the middle tier 350. The middle tier 350 of the J2EE server (or engine) 314 includes the presentation logic (e.g., Web tier) and business logic (e.g., business tier). Examples of the server-side J2EE containers 304-306 include Web containers and EJB containers. The client tier 348 includes a client application 320 to provide J2EE services 306. The client tier 348 may also include an applet container having a browser 324 to display information.

The J2EE containers 304-306 and the client application 320 are, directly or indirectly, in communication with the database 316, located at the Enterprise Information Systems (EIS) tier 352 of the multi-tiered J2EE architecture 300. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/Common Object Request Broker Architecture (COBRA) written using any programming language (e.g., –C, C, and C++).

The J2EE containers 304-306 in the middle tier 350 are associated with various J2EE services and APIs 342, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS), and dbpool service. The J2EE services 402 further include EJB_service, servlet_JSP, application_client_service, connector_service to provide (J2EE containers 304-306, namely) EJB containers, Web containers, application client containers, and connector containers, respectively. It is contemplated the client application 320 may also be associated with a set of J2EE services and APIs 346. However, each of the containers 304-306 may be associated with a different set of J2EE services. For example, on the client tier 348, the client application may be associated with different J2EE services 346 than the J2EE containers 304-306 associated with the J2EE services 342 on the server-side 350. Furthermore, the client-side 348 may or may not be J2EE-based.

According to one embodiment, as illustrated, the J2EE server 314 includes a non-J2EE container 328 and a set of non-J2EE services and interfaces 340. An example of a non-J2EE container 328 and non-J2EE services 340 may include an SAP container and a set of SAP services and APIs, respectively. The non-J2EE services 340 include Webdynpro service, log_configurator service, and monitoring service. According to one embodiment, non-J2EE components deployed in the non-J2EE container 328 may be used to assemble non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 340 may include parallel or similar services to the J2EE services 342. The container API may be used to facilitate registration, unregistration, implementation, and management of not only the J2EE containers 304-306, but also one or more non-J2EE containers 328 on the J2EE server 314. Using a common container API, both the standard J2EE containers 304-306 and the non-J2EE containers 328 may be deployed on the server-side 350, and the J2EE server 314, as whole, regards them as the same. Stated differently, when deploying a non-J2EE container 328, the specific details in the implementation and logic of the non-J2EE container 328 may be kept hidden from the J2EE server 314 so all J2EE and non-J2EE containers 304-306, 328 are to be recognized and regarded the same way as part of the J2EE architecture 300.

The container API, according to one embodiment, is encapsulated in a service 340-342. This is to, for example, expand the J2EE architecture 300 to provide a relatively easy implementation and deployment of services, interfaces, and libraries, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 300 and for enhancing the functionality of the J2EE engine 314 by deploying the non-J2EE containers 328 along with the J2EE containers 304-306. The deploy service may also be used for the deployment of applications, standalone modules (containing both J2EE and non-J2EE components), service, and libraries.

Figure 4:
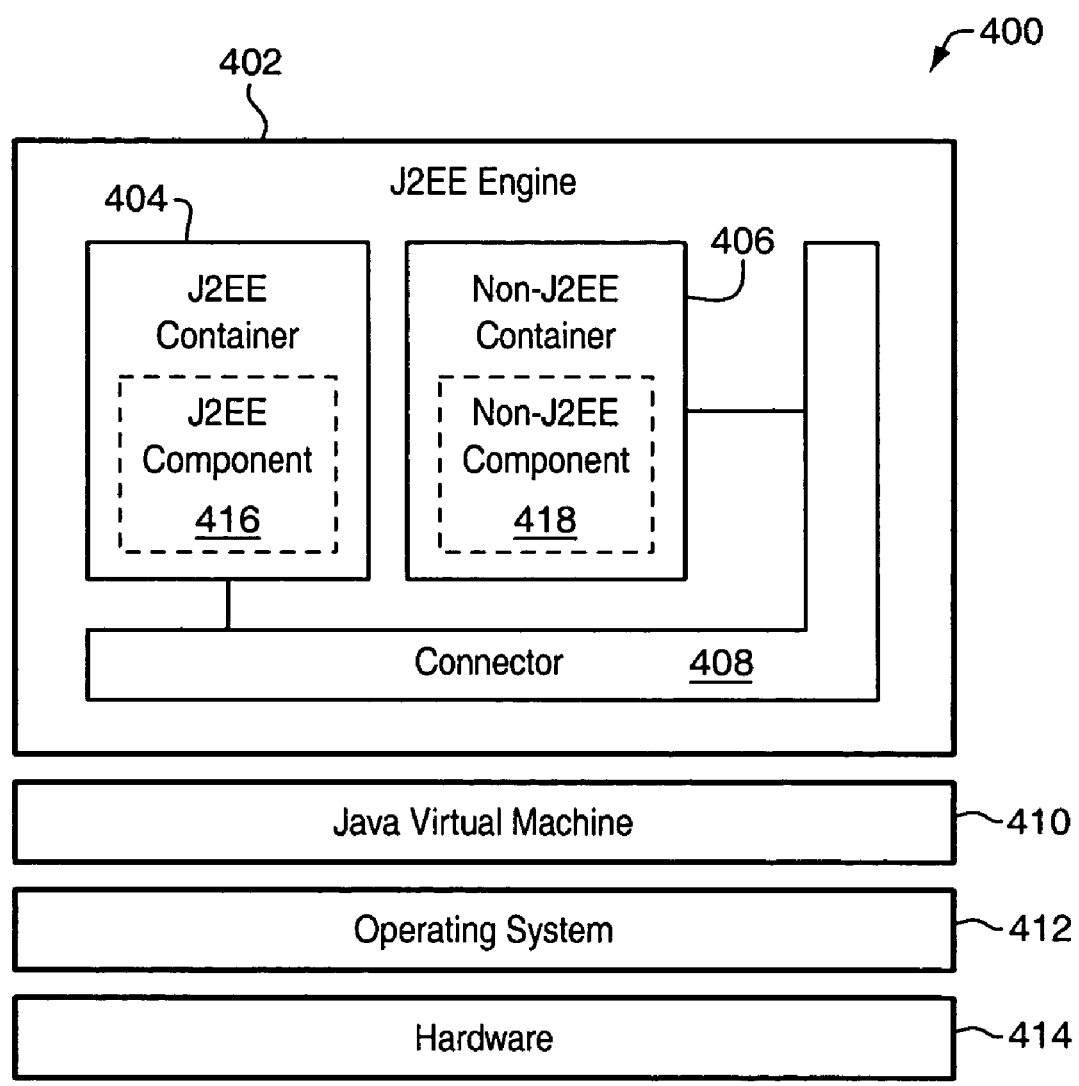
FIG. 4 is a block diagram illustrating a J2EE architecture having J2EE and non-J2EE containers residing on a J2EE engine.

FIG. 4 is a block diagram illustrating a J2EE architecture 400 having J2EE and non-J2EE containers 404-406 residing on a J2EE engine 402. In the illustrated embodiment, the J2EE engine (or server) 402 includes both a J2EE container 404 and a non-J2EE container 406. The J2EE container 404 manages a J2EE component 416, which may be part of a J2EE application. The non-J2EE container 406 manages a non-J2EE component 418, which may be part of a non-J2EE application. The term non-J2EE may refer to a non-J2EE standard element, such as a container 406, component 418, and application and may be synonymous with SAP AG.

The J2EE architecture 400 further includes connectors 408 to provide standard services and APIs to connect the J2EE server 402 and its elements with the rest of the J2EE architecture 400. The connectors 408 may be J2EE or non-J2EE based. The J2EE architecture 400 also includes a JVM 410 to process platform-independent bytecode into platform-specific native code or binary machine code at runtime. The binary machine codes is executed on a hardware 414 using an operating system 412. The operating system 412 may include Microsoft Windows®, Macintosh, Unix, Linux, and the like. The hardware 414 may include a computer processing unit, a storage device, a random access memory, and the like.

Figure 5:
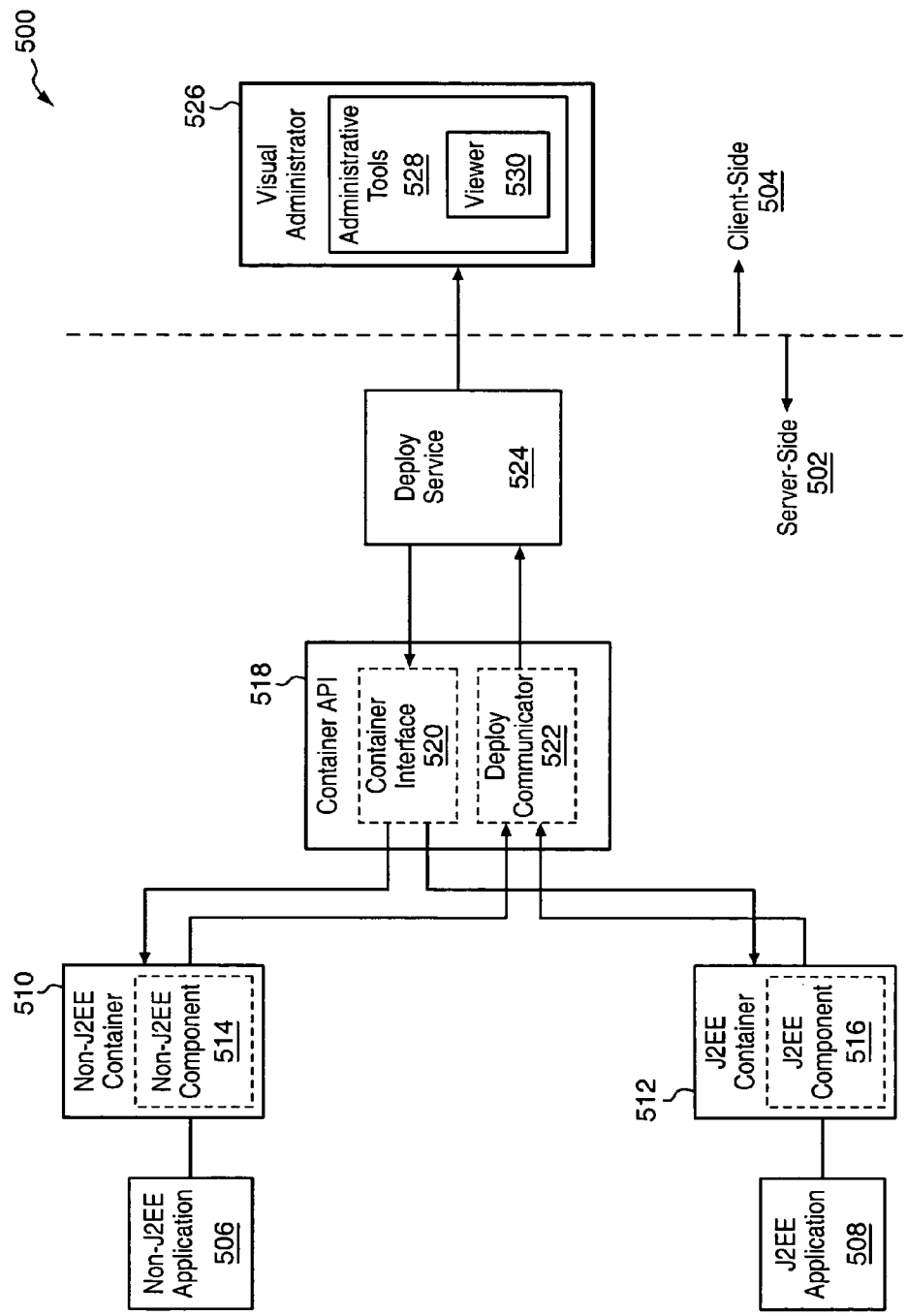
FIG. 5 is a block diagram illustrating a J2EE architecture having a deploy service.

FIG. 5 is a block diagram illustrating a J2EE architecture 500 having a deploy service 524. According to one embodiment, the deploy service 524 serves to extend and enhance the J2EE architecture 500 and its functionalities. The deploy service 524 along with the container API (e.g., SAP container API) 518 help facilitate the deploying of various deployable entities, including J2EE and non-J2EE components 514-516 using J2EE and non-J2EE containers 510-512, respectively. The container API 518 is represented on the server as an interface defined as a development component.

Serving as an entry point for expanding and enhancing the J2EE architecture 500, the deploy service 524 is also used for correct distribution of the deployable entities to their services/containers and a storage place. The storage place is retrieved from configuration manager in the database and the deploy service 524 is to facilitate the storage of all applications so that the containers 510-512 may rely on a consistent storage for the entire application. The application components 514-516 and standalone modules are managed by the containers 510-512, the libraries, services, and interfaces are managed by server's deploy context, which is located at a deeper level in the core of the server because these deployable components are used by applications 506-508 found on a higher level in the J2EE architecture 500. Stated differently, deploy service 524 is used to manage an entire application 506-508, the container 510-512 is used to manage the applications' components 514-516, and the deploy context is used to manage the server components, such as the libraries, services and interfaces. According to one embodiment, the deploy service 524 may obtain the deploy context using its application service context.

According to one embodiment, the container API 518 provides a container interface 520 that is implemented by container services associated with the containers 510-512 (e.g., com.sap.engine.services.deploy-.container.ContainerInterface). Such implementation is to facilitate the deploy service 524 to identify and process various actions on those containers 510-512 that are implemented according to a set of rules including the implementation of the container API 518 by container services. A container service may listen for the availability of the container interface by implementing a container event listener (e.g., com.sap-.engine.frame.container.event.ContainerEventListener).

The container API 518 provides a container management for registration of containers 510-512 by container services when an event indicating the availability of the container API 518 (e.g., <container_api>) is received or listened to by a container service via the container event listener. The container service may then register the container 510-512 using container management. In contrast, when a container 510-512 is rendered not available that container 510-512 is unregistered using the container management (e.g., <com.sap-.engine.services.deploy.container.ContainerManagement>). Stated differently, the contianer services are provided with an opportunity to register their corresponding containers 510-512 with the conatiner API 518 and the deploy service 524 when the continers 510-512 become available and are ready to to perform deployment operations. In contrast, the containers 510-512 may be unregsitered when once they stop or become unavailable.

According to one embodiment, the container API 518 also incldues deploy communicator 522 in combination with the container interface 520. The availability of the deploy commmunciator 522 and the container interface 520 allows the deploy service 524 and the containers 510-512 to communicate bi-directionally. Stated differently, using the container interface 520, the information flows from the deploy service 524 to the containers 510-512. Each of the containers 510-512 may obtain an instance of the deploy communicator 522 during its registration to communicate back with the deploy service 524.

Using the deploy communicator 522, the information may flow from the containers to the deploy service 524. Such information may include information relating to the status, requesting runtime information, initiating operations from containers 510-512, etc., flowing back to the deploy service 524. Such information allows the deploy service 524 to be more efficient by, for exmaple, allowing the containers 510-512 to request to lock the application or changes that may occur due to some property changes in the container 510-512, or by having the deploy service 524 request the changes by update. Another exmaple includes allowing a container 510-512 to stop its deployed applications in the container service stop method, since applications are usually consisting of more than one component and the deploy service 524 may know the entire configuration of an application.

According to one embodiment, the instance of "container info" including information for identification of a container 510-512 may have a set of properties with set/get methods. Some of the properties include: (1) determination of whether a container 510-512 is a J2EE container 512 (e.g., EJB, Web, application, client, resource adapter) or a non-J2EE container 510 (e.g., SAP container); (2) for J2EE containers 512, specification of the type of the components 516 deployed (e.g., String j2eeModuleName); (3) for non-J2EE containers 510, specification of the type of the components 514 deployed (e.g., String moduleName); (4) specification of the priority of a container 510-512, for example, when an application is being deployed, stopped, and started, deploy service 524 knows in what order to notify the concerned containers 510-512. During deployment and start of an application, the containers 510-512 having higher priority are notified first, and during stop of an application the containers 510-512 with lower priority are first notified (e.g., int priority); (5) specification of a container's unique name (e.g., String name); (6) specification of a set of extensions of files which represents components 514-516 deployed on the respective containers 510-512 (e.g., String [ ] fileExtentions); (7) specification of a set of names of files which represent components 514-516 deployed on the respective containers 510-512 (e.g., String [ ] filenames); (8) specification of the name of the service that provides the container (e.g., String serviceName); (9) determination of whether the container 510-512 supports the operation "single file update" (e.g., Boolean supportsSingleFileUpdate); and (10) specification of the kind of resource types that are supported by the container (e.g., String [ ] resourceTypes).

According to one embodiment, filenames and extensions may be used by the deploy service 524 for distribution of the deployable components 514-516 on the containers 510-512. The deploy service 524 may include a mechanism for automatic recognition of the container 510-512 to which the corresponding deploying components 514-516 may be distributed, in accordance with the filenames and extensions contained in the <container info> of each of the containers 510-512. For example, if a standalone module file has an extension Web ARchive (e.g., WAR or war), and the J2EE Web container has specified this extension in its <container info>, the deploy service 524 may distribute the WAR file to the Web container.

Figure 6:
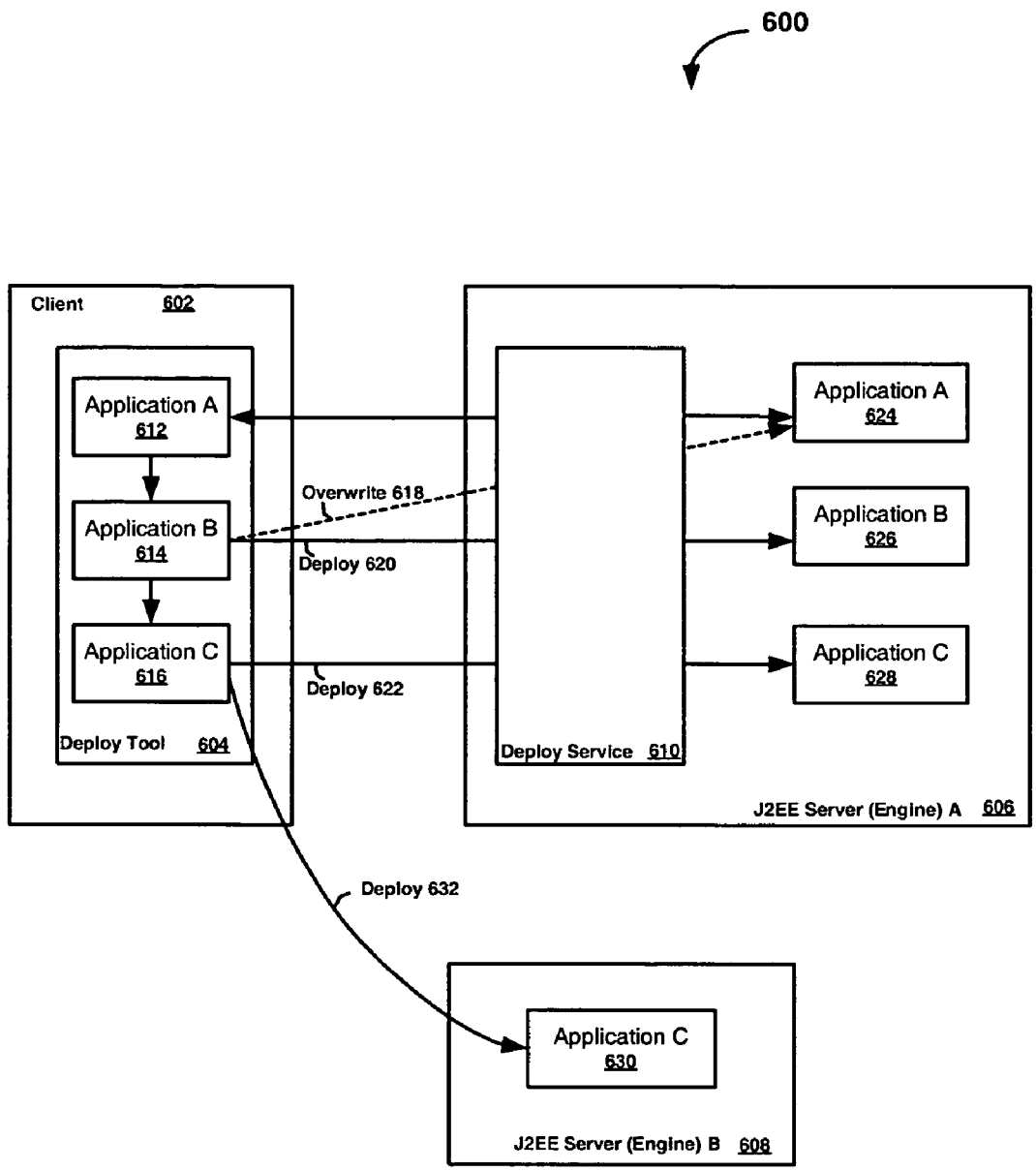
FIG. 6 is a block diagram of an embodiment of a J2EE architecture having a deployment system for cloning applications.

FIG. 6 is a block diagram of an embodiment of a J2EE architecture having a deployment system 600 for cloning applications. In the illustrated embodiment, a user (e.g., deployer or administrator) using a deploy tool 604 at a client 602 accesses application A 612 to be cloned into application B 614. In one embodiment, the cloning of application A 612 is performed without disturbing or even accessing the identical application A 624 residing on server (or engine) A 606 that is J2EE-based. Application cloning is particularly useful when only small and specific information (e.g., certain descriptive information) needs to be changed in the application A 612 to, for example, adjust the contents of the application A 612 according to a change in the work environment. The option of application cloning allows a user at the client 602 to not only clone an application A 612 on the client 602 without accessing the corresponding application A 624 on the server A 606, but also allows the user to compare applications A and B 612-614 on the client 602 once the cloning is completed and before deploying 620 the cloned application B 614 as application B 626 on the server A 606.

In one embodiment, after performing the comparison of applications A and B 612-614, the user may deploy 620 the cloned application B 614 on the server A 606 as application B 626 to be regarded as separate and distinct from application A 624 by the server A 606. The user, via the client 602, may also choose to overwrite 618 the original application A 624 with the cloned application B 614 on the server A 606 by deploying the application B 614 on to the application A 624 on the server A 606. Stated differently, application cloning allows the user to have one or more versions (e.g., application B 614) of the one application A 612 for comparison purposes, and further allows the user to deploy and store both the original application A 612 and its clone application B 614 on the server A 606 as application A 624 and application B 626, respectively, to be recognized as two distinct applications A and B 624-626 or use the clone application B 614 to overwrite 618 the original application A 624 on the server A 606.

To have the server A 606 recognize the original application A 624 and its clone application B 626 as two separate applications, application B 614 may be assigned a different application name (e.g., application B) and a different Web alias (e.g., Web B). By having a different application name and Web alias, the server A 606 may recognize the two applications A and B 624-626 as two different applications, even though application B 614 (deployed 620 on the server A 606 as application 626) is a clone of application A 612 (residing at the server A 606 as application A 624). In another embodiment, the user may choose to run comparison of applications A and B 612-614 on the client 602 and to overwrite 618 application A 624 on the server A 606 with the clone application B 614. This is to allow the user to run comparison tests without overburdening the server A 606, without accessing application A 624 on the server A, and without having to deploy the clone application B 614 on the server A 606. In yet another embodiment, the user may choose to neither deploy 620 nor overwrite 618 the application B 614.

In one embodiment, using application cloning, a user, using the client 602, may be allowed to clone a clone application B 614. For example, the user may choose to clone application B 614 into clone application C 616. As with application B 614, the user is allowed to further clone application C 616 to create another version of application 612 (and thus, application 624), to make amendments to applications B and C 614-616 without accessing application A 624 on the server A 606, to deploy application C 616 on the server A 606 as application C 628, and to overwrite application A 624 with application C 616. Furthermore, the user may run simultaneous comparison tests on application A 612 and its clone applications B and C 614-616 without overburdening the server A 606 and without accessing application A 624. It is contemplated that multiple clones of application A 612 and its clone applications B and C 614-616 can be made by the user at the client 602. According to embodiment, application C 616 may not only be deployed 622 on the server A 606, but also be deployed on any other server, such as server B 608, in a cluster of servers A and B 606-608. As with application C 616, any other clone applications, such as application B 614, may also be deployed on other servers in the cluster. Furthermore, as with application B 614, application C 616 is assigned a new name (e.g., application C) and a new Web alias (e.g., Web C) to be deployed 622-632 and recognized as a distinct application C 628-630 by the servers A and B 606-608 in the cluster. In one embodiment, comparison and performance tests may be conducted on the client 602 with application A-C 612-616, or they may be conducted on the server A 606 with application A-C 624-628. With regard to overwriting an application, such as application A 624, on the server A 606, the assignment of the new application name and the Web alias may not be necessary.

In one embodiment, the user may access a deploy tool 604 on the client 602 to perform application cloning. The deploy tool 604 may sit for a visual administrator, a telnet session, or any other such tool. The visual administrator may include a viewer, such as a GUI-based or Web-based viewer (e.g., Microsoft® Internet Explorer or Netscape Navigator). The deploy tool 604 may be used to access, clone, deploy, and view any number of applications A-C 612-616.

According to one embodiment, application 612 serves as a medium for the user to communicate with the J2EE server 606. Application cloning of the application 612 makes it easier and less time consuming for the user to attend to the growing requirements of various business entities. The process of application cloning not only helps save time and human resources, but also helps raise software and application quality. Also, having multiple applications A-C 624-628 available and running simultaneously on the server A 606 allows the user to have multiple versions of the same application A 624 (or application A 612) while performance tests are run, comparisons are made, changes are estimated, and optimal settings are chosen to provide a better application for use and avoid future mistakes. Different application names (e.g., application A, B and C) and Web alias (e.g., Web A, B and C) allow the server A 606 to regard each of the applications A-C 624-628 as separate and/or distinct applications despite applications B and C 626-628 being direct or indirect clones (e.g., having identical components) of application A 624. Using application cloning, an application with new functionality on the basis of existing one may be created by adding, removing and changing classes, modules and descriptive information of the original application A 624.

Figure 7:
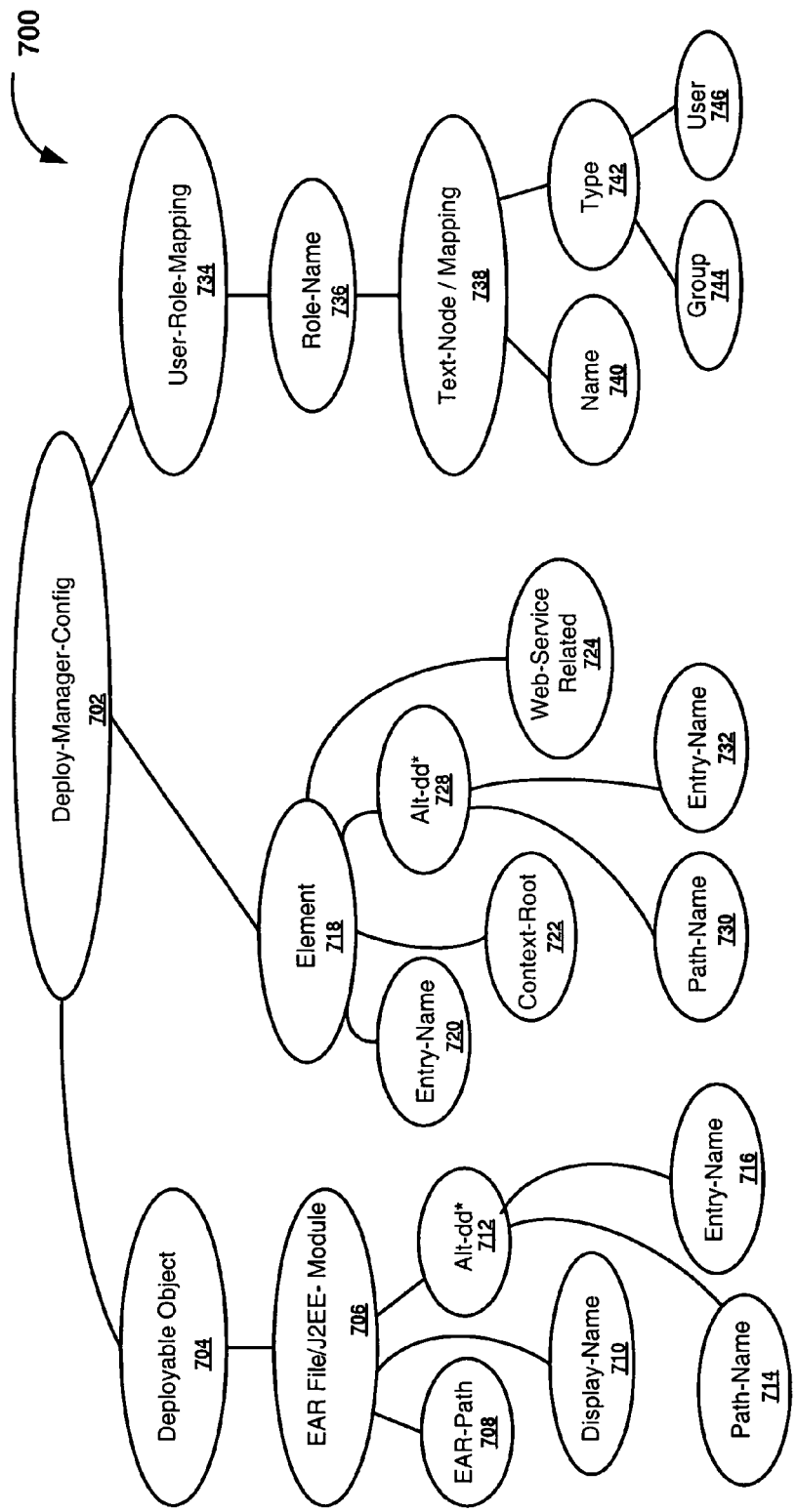
FIG. 7 is a block diagram illustrating an embodiment of an application cloning schema.

FIG. 7 is a block diagram illustrating an embodiment of an application cloning schema 700. As illustrated, the schema 700 includes a deploy manager configurator (e.g., <deploy-manager-config>) 702 as being the main element of the eXtensible Markup Language (XML)-based file deployer.xml. The deploy manager configurator 702 is associated with a deployable object (e.g., <deployable-object>) 704 representing the type of an object to be deployed. For example, the deployable object 704 may describe an Enterprise ARchive (e.g., EAR or ear) file or a J2EE module (e.g., <j2ee-module>) 706. In most cases, the deployable object 704 includes an EAR file 706 to be deployed representing an application associated with or included in the EAR file 706 is being deployed. The J2EE module 706 reflects that a J2EE module represented by an archive is to be deployed. EAR path (e.g., <ear-path>) 708 is the relative path to the EAR file in the project directory.

In the illustrated embodiment, the display name (e.g., <display-name>) 710 represents the application name as it is displayed by a deploy tool. It is the display name 710 of the application (e.g., application A) that is changed to another name (e.g., application B) when the application is cloned. The change of display name 710 and the Web alias is performed so the J2EE server may run the original application (e.g., application A) and its clone application (e.g., application B) simultaneously and regard the two applications as two separate and distinct applications. Alternative deployment descriptors (e.g., <alt-dd>) 712 include a list of alternative deployment descriptors for the EAR file to be deployed path name provides a relative path (e.g., <path-name>) 714 to both the standard J2EE-based applications descriptor (e.g., <application.xml>) and non-standard non-J2EE application descriptor (e.g., <application-j2ee-engine.xml>) containing user changes over the application. These alternative deployment descriptors 712 are placed in the new EAR file. The entry name (e.g., <entry-name>) 716 represents the name of the alternative deployment descriptor (e.g. <application.xml> or <application-j2ee-engine.xml>).

The deploy manager configurator 702 is further associated with an element 718 that is used to represent the EAR module having an entry name 720 representing the EAR module name and a context root (e.g., <context-root>) 722 representing the Web alias, as previously discussed, of the module in case it is a Web module represented by a WAR file. The element 718 is further associated with alternative deployment descriptors 728 representing a list of alternative deployment descriptors for the module indicating the relative path 730 to the standard J2EE-based and additional non-J2EE-based XML files having users changes over such application modules. The alternative deployment descriptors 728 are placed in the new EAR file. The entry name 732 represents the name of the alternative deployment descriptor (e.g. <ejb-jar.xml>, <web.xml>, <ra.xml>). The element 718 is further associated with a Web services related element (e.g., <web-services-related>) 724 indicating whether the module is related to Web services.

In one embodiment, the deploy manager configurator 702 is further associated with user role mapping (e.g., <user-role-mapping>) 734 having security roles and their mapping to real users 746 and groups 744 existing on the server. The user role mapping 734 includes a role name 736 (e.g., <role-name>) representing the name of the security role, which is associated with the mapping 738 indicating the mapping for this role to server users 746 and/or groups 744. The mapping 738 includes a name 740 indicating the name of the user 746 or group 744 and a type 742 indicating whether the user is an individual user 746 or a group 744.

In one embodiment, the display name 710 may be shown and be changeable in the deployer tab of the deploy tool on the client. Similarly, the context root 722 or the Web alias for WARs may also be changeable. The display name 710 and the context root 722 are saved in the file deployer.xml if they are changed. The security roles for the EAR file, with or without user role mapping 734, are also saved in the deployer.xml. Also, any changes to the display name 710 and the context root 722 may be performed in the deployer.xml. If the deployer.xml file contains information that is different from the original information for any of the fields, the information in the deployer.xml is given priority in recognition over the original information for those particular fields. For example, if the GUI field in the deployer.xml differs from the original GUI field in the descriptor section of the EAR file, the GUI field in the deployer.xml is recognized over the original GUI field.

Figure 8:
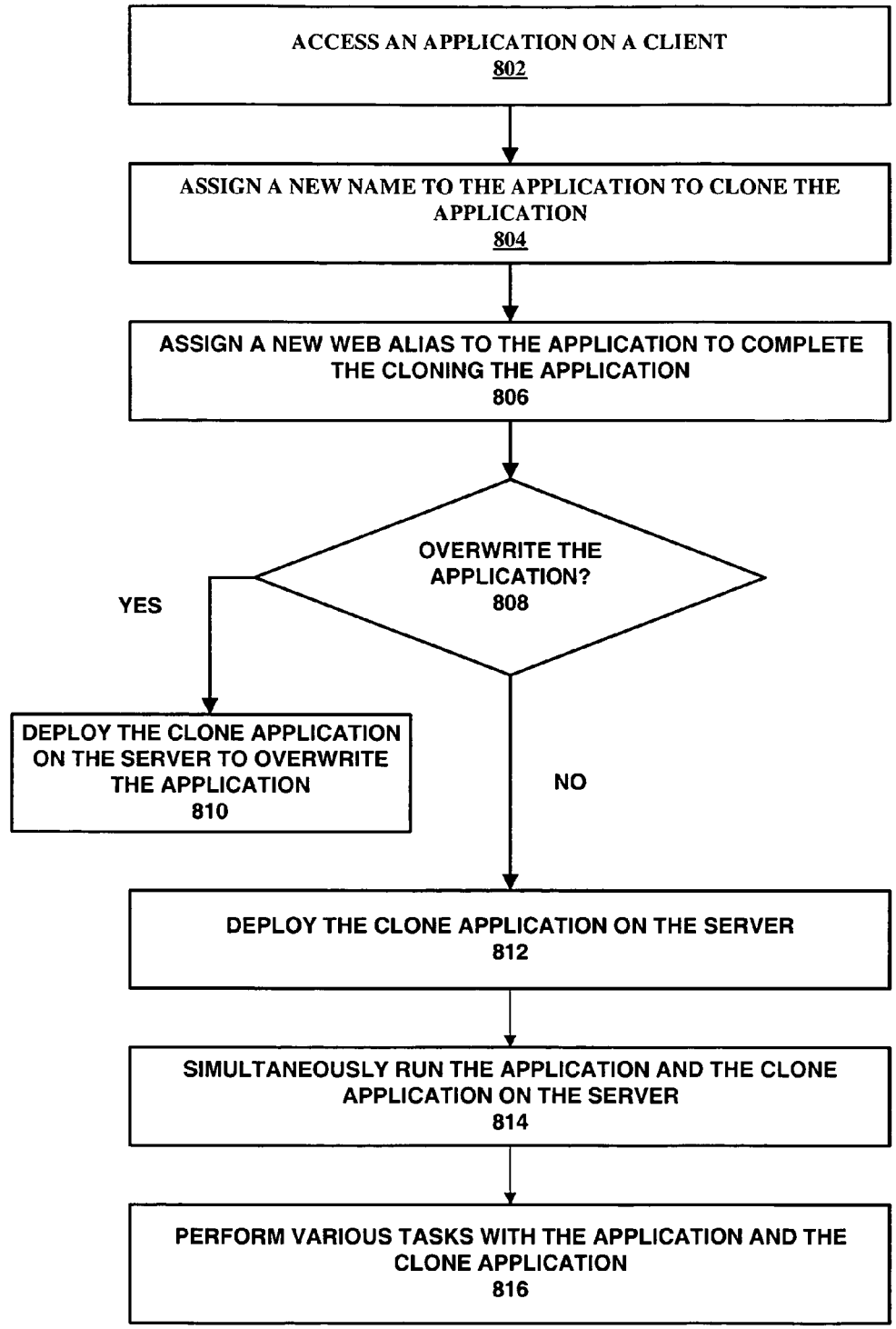
FIG. 8 is a flow diagram illustrating an embodiment of a process for application cloning.

FIG. 8 is a flow diagram illustrating an embodiment of a process for application cloning. First, at processing block 802, using a deploy tool on a client, a user (e.g., deployer or administrator) accesses an application to be cloned. At processing block 804, for cloning the application, the user assigns a new name to the application. The new application name is also known as the display name that is used to display the application on the client using the deploy tool. A new Web alias may then be assigned to the application at processing block 806. The Web alias may relate to the context root representing the alias or address of the Web module of the application represented by a WAR file. In one embodiment, the combination of the assignment of the new application name and Web alias to the original application allows a server (e.g., a J2EE server or engine) to regard the original application and its clone as two separate and distinct applications and may run two applications simultaneously. The application may include a standard J2EE application descriptor (e.g., application.xml) or a non-standard non-J2EE application descriptor (e.g., application-j2ee-engine.xml). It is contemplated that a non-J2EE application may be based on a non-J2EE container using non-J2EE components, but deployed on a J2EE server.

At decision block 808, a determination is made as to whether the clone application is used to overwrite the original application on the server. If the clone application is to overwrite the original application, it is performed by deploying the clone application on the server so that the original application is overwritten at processing block 810. The overwriting of the application may involve deploying the clone application with the same name and Web alias as the original application or deleting the original application from the server.

In one embodiment, the clone application may be used to perform various tasks by deploying the clone application on the server at processing block 812. The tasks may include comparing the functionalities of the clone application with those of the original application, reviewing the functionalities of the clone application, adding one or more functionalities to the functionalities of the clone application, removing one or more of the existing functionalities of the clone application, and changing, correcting, and amending any one or more of the existing functionalities of the clone application. Each of the tasks is and may be performed independent of the other.

In one embodiment, having a different application name and Web alias allows the clone application to be recognized and regarded as a separate and distinct application from the original application even if the clone application contains contents that are identical to those of the original application. Stated differently, the application and its cloned application (even with identical contents) are simultaneously run on the same server and are nevertheless, regarded as two different applications at processing block 814. At processing block 816, by simultaneously running the application and its clone on the same server, the user may perform a number of tasks, such as comparison tests, performance tests, amendments to functionalities, and addition and/or removal of functionalities, on the two applications for correcting existing problems and/or improving future applications and software.

In embodiment, to clone an application, the application name is changed to a new application name. If the application contains no Web modules, not other changes are needed. However, if the application contains any Web modules, the Web aliases corresponding to such Web modules may be changed to new Web aliases. Each of the Web modules is associated with one Web alias; however, the application may contain any number of Web modules. For example, to clone an application having three Web modules, the name of the application and three Web aliases are changed. Furthermore, if one of the Web modules is removed, then the two Web alias corresponding to the two remaining Web modules are changed or reset if previously changed.

In one embodiment, the cloning of an application allows a user to change various components of the application using the clone application. The components include files, modules, and descriptive information of various kinds, such as text, Hyper-Text Markup Language (HTML), class, image, and the like. Stated differently, changing the application name and/or the Web alias to allow amendments to be made to the contents of the application. In another embodiment, the cloning of the application may be performed by changing other forms of identification of the application, such as an application ID, on various servers and platforms.

The comparison test and performance test include running a variety of tasks, troubleshooting tests, critical measurement tests, and changing functionality tests. For example, the comparison and performance tests may include measuring and estimating various components and modules of the clone application and then compiling a result based on the measurement and estimation of the components and modules. The result corresponding the clone application may then be compared to a result, similarly obtained, for the original application. Based on this comparison, a determination may be made as to which one of the two applications may be kept or deployed, while the other one may be deleted or maintained as a backup application. In one embodiment, both applications may be selected to perform various functions. The comparison and performance tests may also include making amendments to the applications, such adding, removing, and modifying of modules, classes, and descriptive information contained in the applications. In one embodiment, the comparison and performance tests, as well as other amendments, may be performed not only on the original application and its clone application, but also on other clones of the original application and its clone application.

Figure 9:
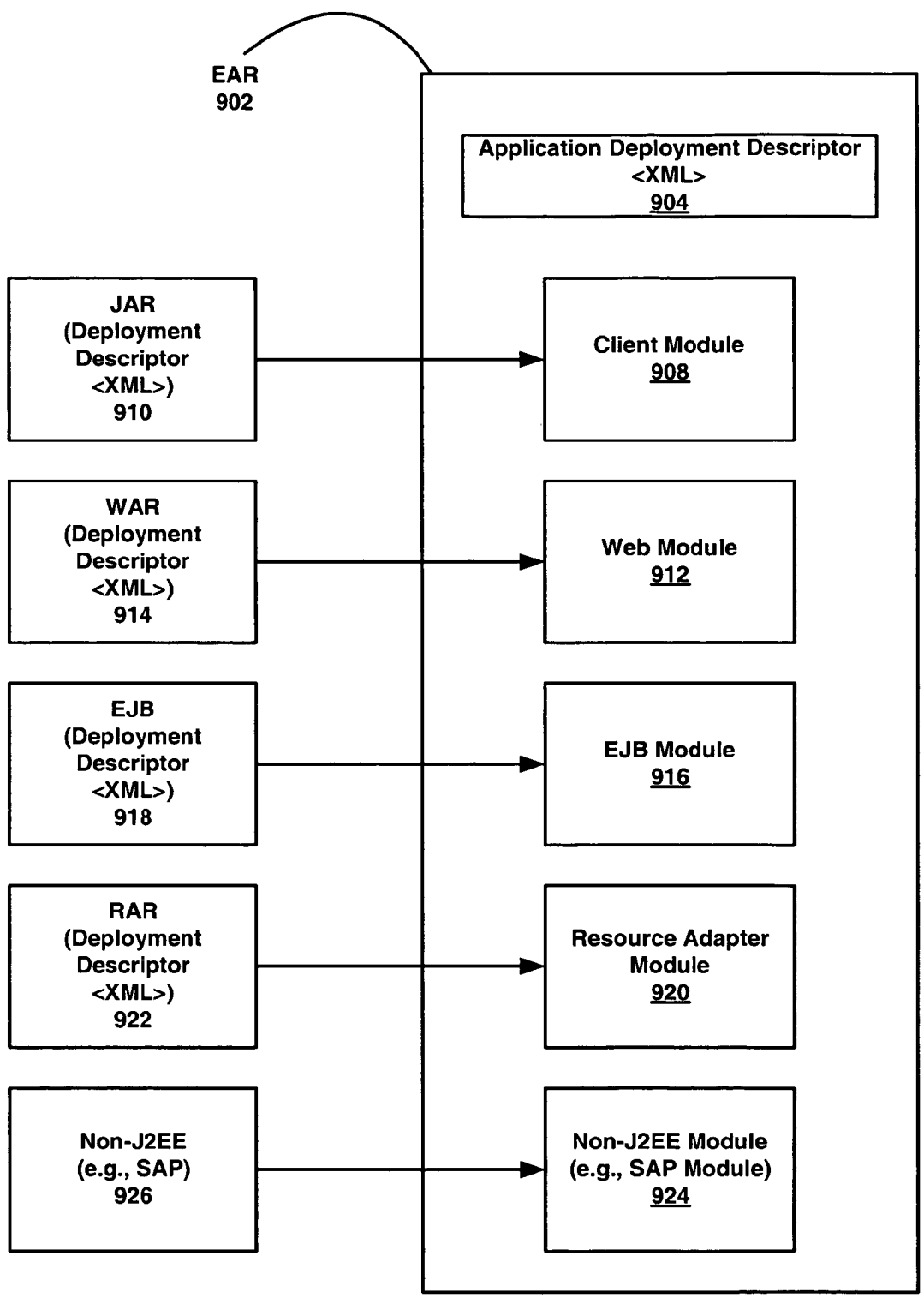
FIG. 9 is a block diagram illustrating an embodiment of an application to be cloned.

FIG. 9 is a block diagram illustrating an embodiment of an application 900 to be cloned. In the illustrated embodiment, the application 900 represented by an EAR file 902 having various modules and components. For example, the EAR file 902 includes an application deployment descriptor 904 in the XML form having important application-related descriptive information. The EAR file 902 further includes the following: a client module 908 associated with a Java ARchive (e.g., JAR or jar) 910 having a corresponding XML-based deployment descriptive file; a Web module 912 associated with a WAR 914 having a corresponding XML-based deployment descriptive file; an EJB module 916 associated with an EJB JAR 918 having a corresponding XML-based deployment descriptive file; and a resource adapter module 920 associated with a Resource Adapter Archive (RAR) 922 having a corresponding XML-based deployment descriptive file.

In one embodiment, the application EAR file 902 also includes a non-standard, non-J2EE based module (e.g., SAP-based module) 924 to create a non-J2EE application 900 using non-J2EE containers and non-J2EE components. The non-J2EE module 924 may be associated with a file in a non-J2EE specific format 926 having a corresponding non-J2EE XML-based deployment descriptive file. It is contemplated that the application 902 may be a standard J2EE application with standard J2EE modules and components.

Figure 10A:
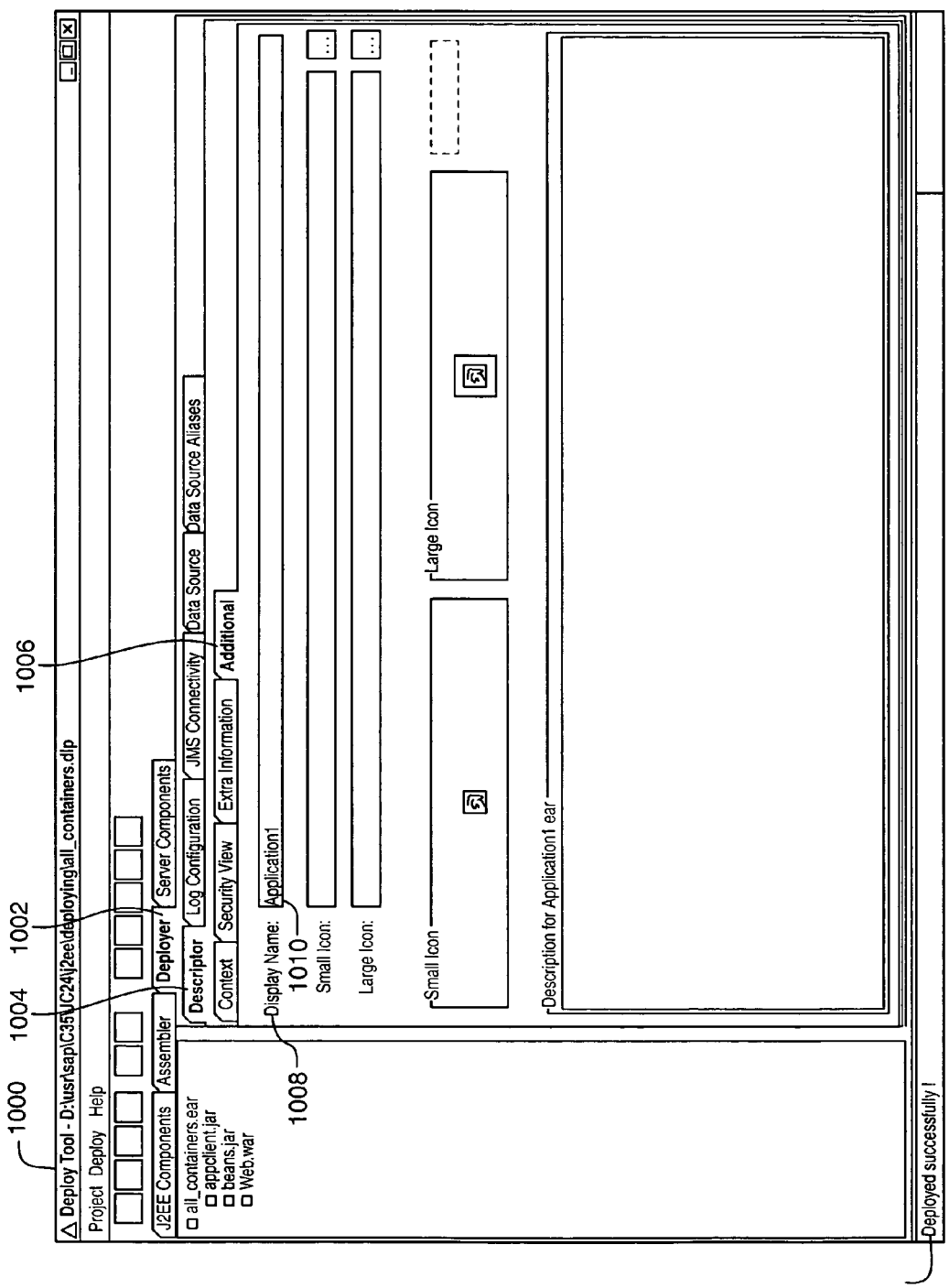
FIG. 10A is an exemplary illustration of an embodiment of a deploy tool viewer.

FIG. 10A is an exemplary illustration of an embodiment of a deploy tool viewer 1000. As illustrated, the deploy tool viewer 100 having various tabs including a deployer tab 1002 having a descriptor tab 1004. The descriptor tab 1004 further includes an additional tab 1006 which may be used to clone an application. For example, an application, e.g., sap.com/Appl*Web, may be cloned to another application. The additional tab 1006 includes a display name 1008 where the new application name for the clone application may be inserted. In the illustrated embodiment, the new application name for the clone application is Application1 1010.

Figure 10B:
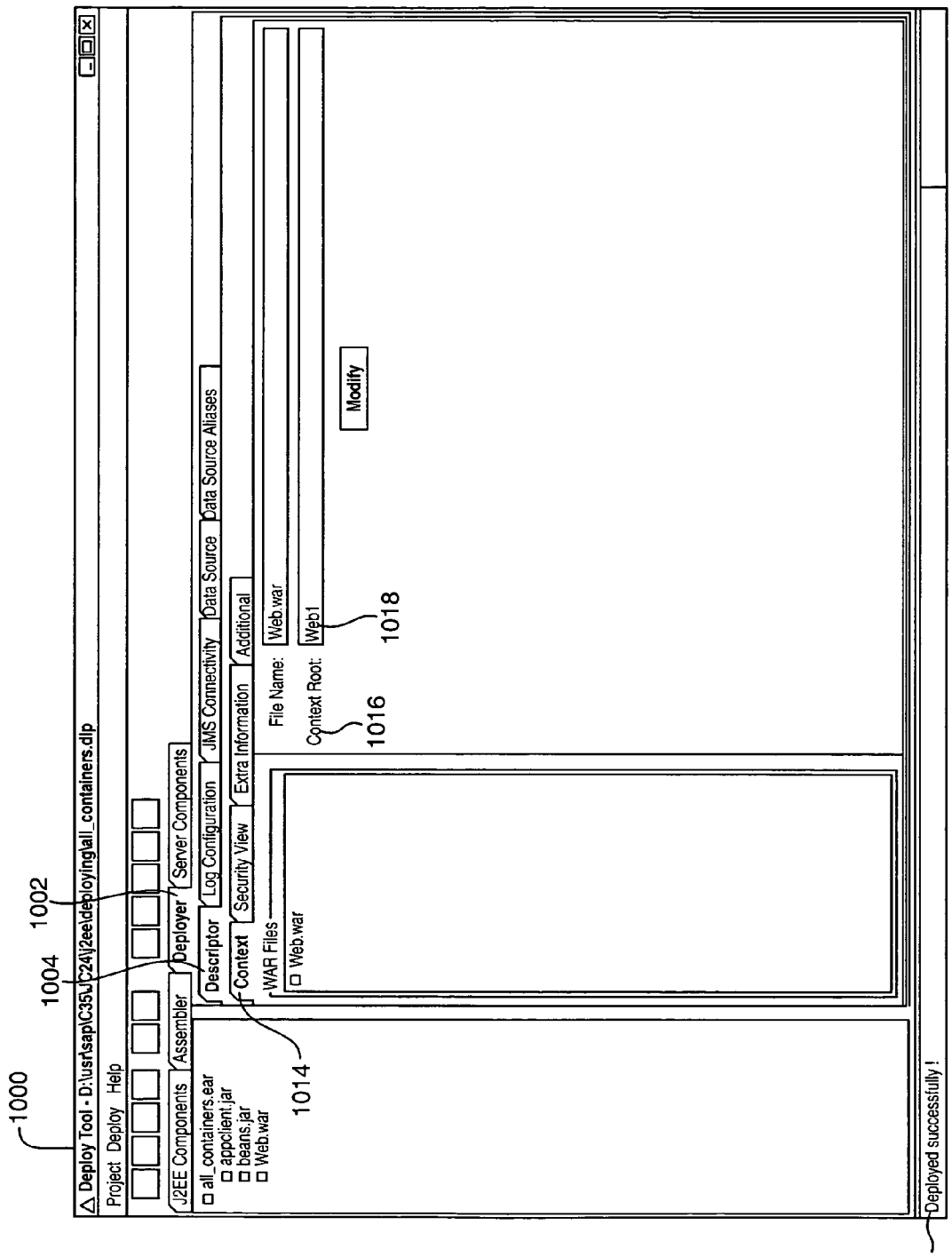
FIG. 10B is an exemplary illustration of an embodiment of a deploy tool viewer.

FIG. 10B is an exemplary illustration of an embodiment of a deploy tool viewer 1000. In the illustrated embodiment, the context tab 1014 under the descriptor tab 1004 is selected to assign a new Web alias to the cloned application. The context tab 1014 includes context root 1016 for entering the new Web alias, such as Webl 1018, for the clone application, Application1 1010 of FIG. 10A.

Figure 10C:
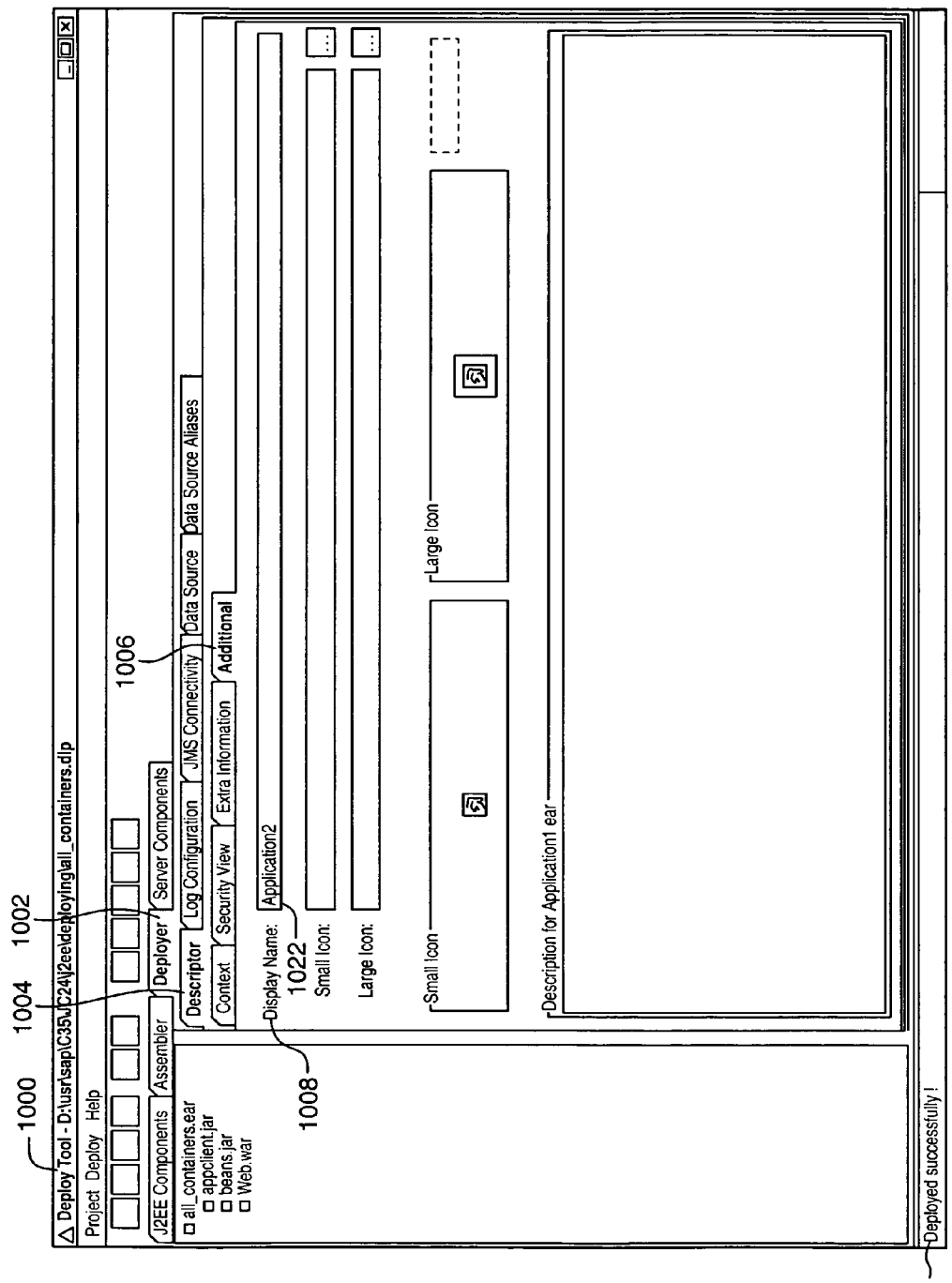
FIG. 10C is an exemplary illustration of an embodiment of a deploy tool viewer.

FIG. 10C is an exemplary illustration of an embodiment of a deploy tool viewer 1000. In one embodiment, an application may be cloned multiple times and each of the clone applications may also be cloned into multiple applications. In the illustrated embodiment, the application is further cloned into Application2 1022 as shown under display name 1008 of the deploy tool viewer 1000.

Figure 10D:
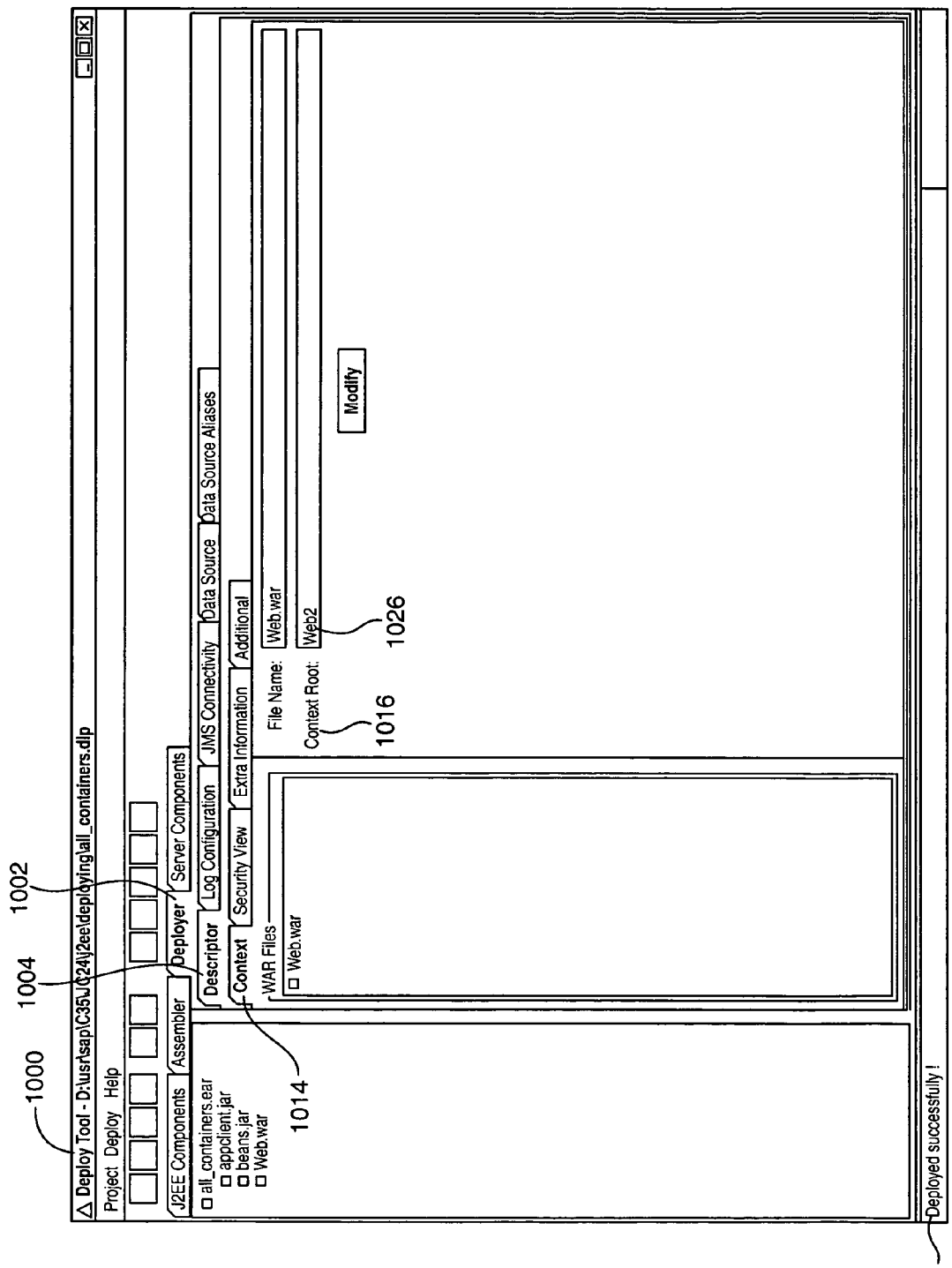
FIG. 10D is an exemplary illustration of an embodiment of a deploy tool viewer.

FIG. 10D is an exemplary illustration of an embodiment of a deploy tool viewer 1000. In the illustrated embodiment, the (second) clone Application2 1022 is also assigned a new Web alias, Web2 1026, in the context root 1016 part of the deploy tool viewer 1000. As stated previously, an application may be further cloned into multiple applications having different application names (e.g., Application3, Application4, Application5, Application6) and corresponding Web aliases (e.g., Web3, Web4, Web5, Web6). The clone applications may also be further cloned and deployed on the server.

Figure 10E:
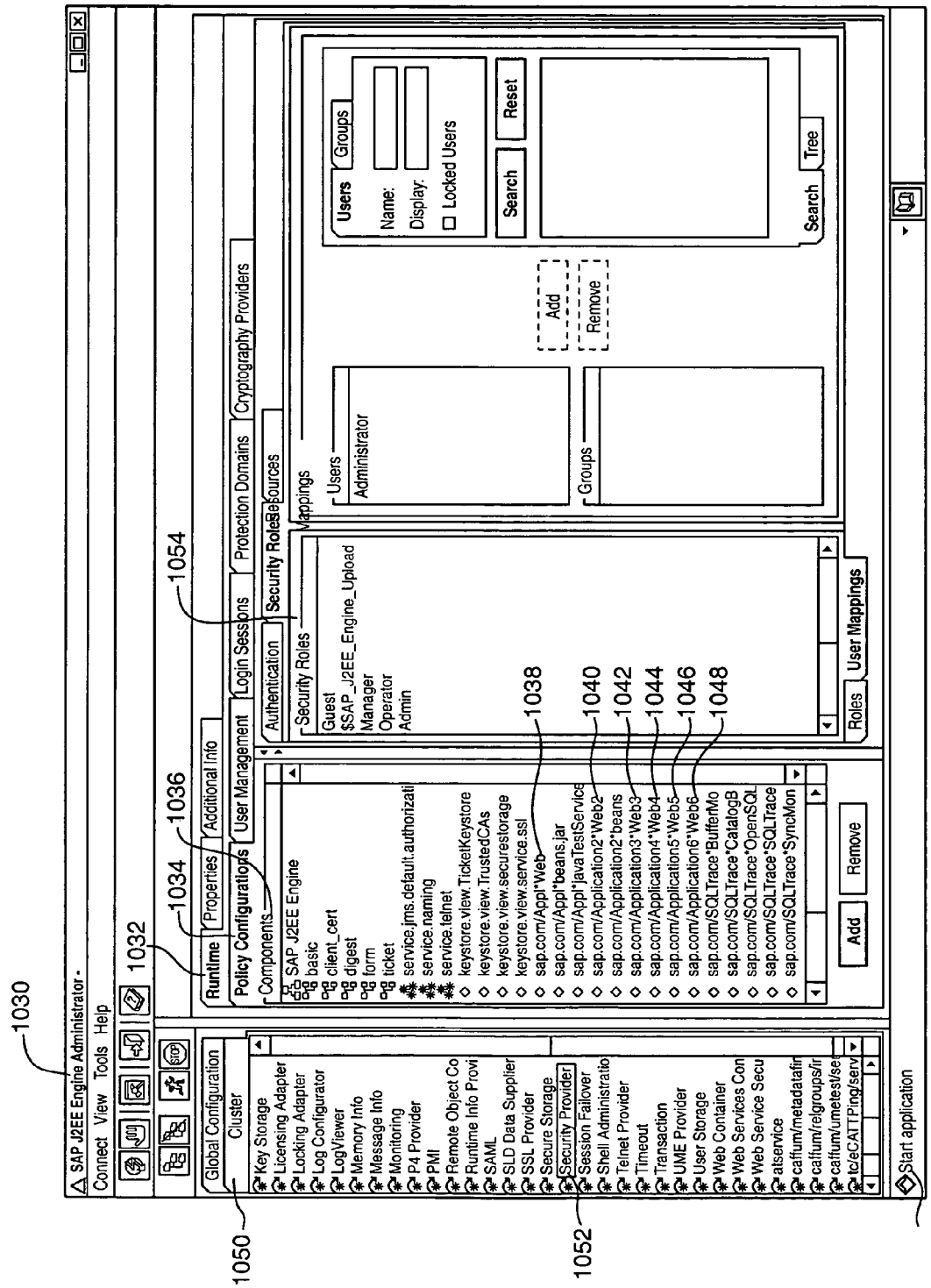
FIG. 10E is an exemplary illustration of an embodiment of an administrator tool viewer.

FIG. 10E is an exemplary illustration of an embodiment of an administrator tool viewer 1030. The right portion of the administrator tool viewer 1030 illustrates a series of tabs including a runtime tab 1032 including a policy configurations tab 1034, which shows components 1036 residing on the relevant server. The components 1036 illustrate the original application (e.g., sap.com/Appl*Web) 1038 and its following clones Application2 (e.g., sap.com/Application2*Web2) 1040, Application3 (e.g., sap.com/Application3*Web3) 1042, Application4 (e.g., sap.com/Application4*Web4) 1044, Application5 (e.g., sap.com/Application5*Web5) 1046, and Application6 (e.g., sap.com/Application6*Web6) 1048. In the illustrated embodiment, the administrator tool viewer 1030 does not show Application1 (e.g. sap.com/Application1*Web1), but the Application 1 may be hidden or may have been deleted by the user. The left window, such as cluster 1050, illustrates various choices available to the user. Here, security provider 1052 is selected which shows security roles 1054 for Application6 1048.

Figure 10F:
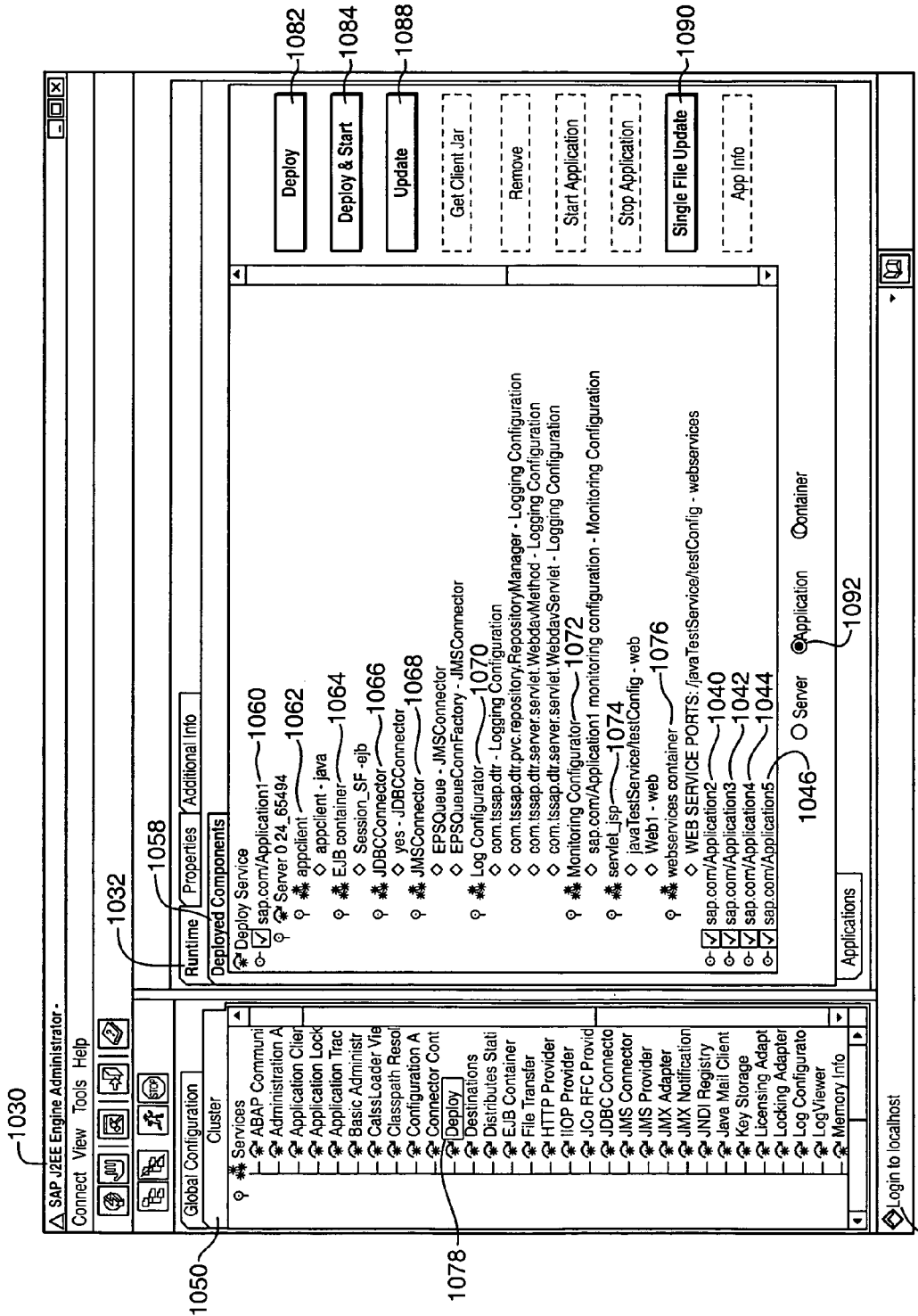
FIG. 10F is an exemplary illustration of an embodiment of an administrator tool viewer.

FIG. 10F is an exemplary illustration of an embodiment of an administrator tool viewer 1030. In this illustrated embodiment, deploy 1078 is chosen as an option from several options available under the cluster tab 1050. Also, deployed components window 1058 under the runtime tab 1032 shows the various modules and containers 1062-1076 of Application1 1060 which is a clone of the original application 1038. The deployed components window 1058 further shows cloned Applications2-Applications 5 1040-1046. This is shown under the option of applications 1092. One side of the administrator tool viewer 1030 provides several deployment-related options, such as deploy 1082, deploy & start 1084, update 1088, and single file update 1090. The status bar 1056 is located at the bottom of the administrator tool viewer 1030 for continuously displaying status messages.

Figure 10G:
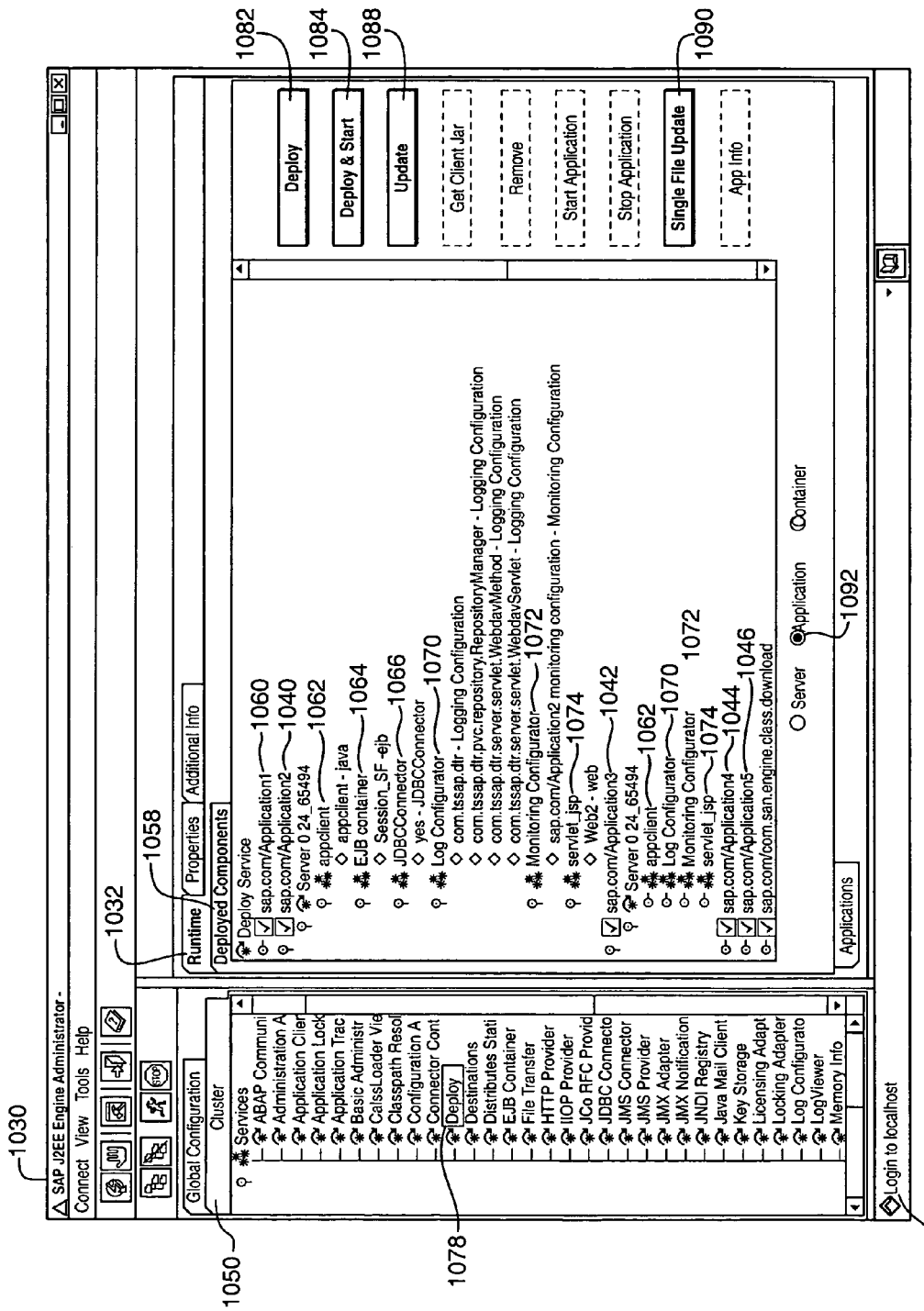
FIG. 10G is an exemplary illustration of an embodiment of an administrator tool viewer.

FIG. 10G is an exemplary illustration of an embodiment of an administrator tool viewer 1030. Using the same options as of FIG. 10F, in this embodiment, modules and containers 1062-1066, 1070-74 of clone Application2 1040 and modules and containers 1062, 1070-1074 of clone Application3 1042 are illustrated. It is to be noted that although Application2 1040 is a clone, components for JMSConnector 1068 and webservices_container 1076 have been deleted from it, in comparison to the first clone Application1 1060. Similarly, in comparing to Application1 1060, Application3 1042 does not include components for EJBContainer 1064, JDBCConnector 1066, JMSConnector 1068, and webservices_container 1076.

Figure 10H:
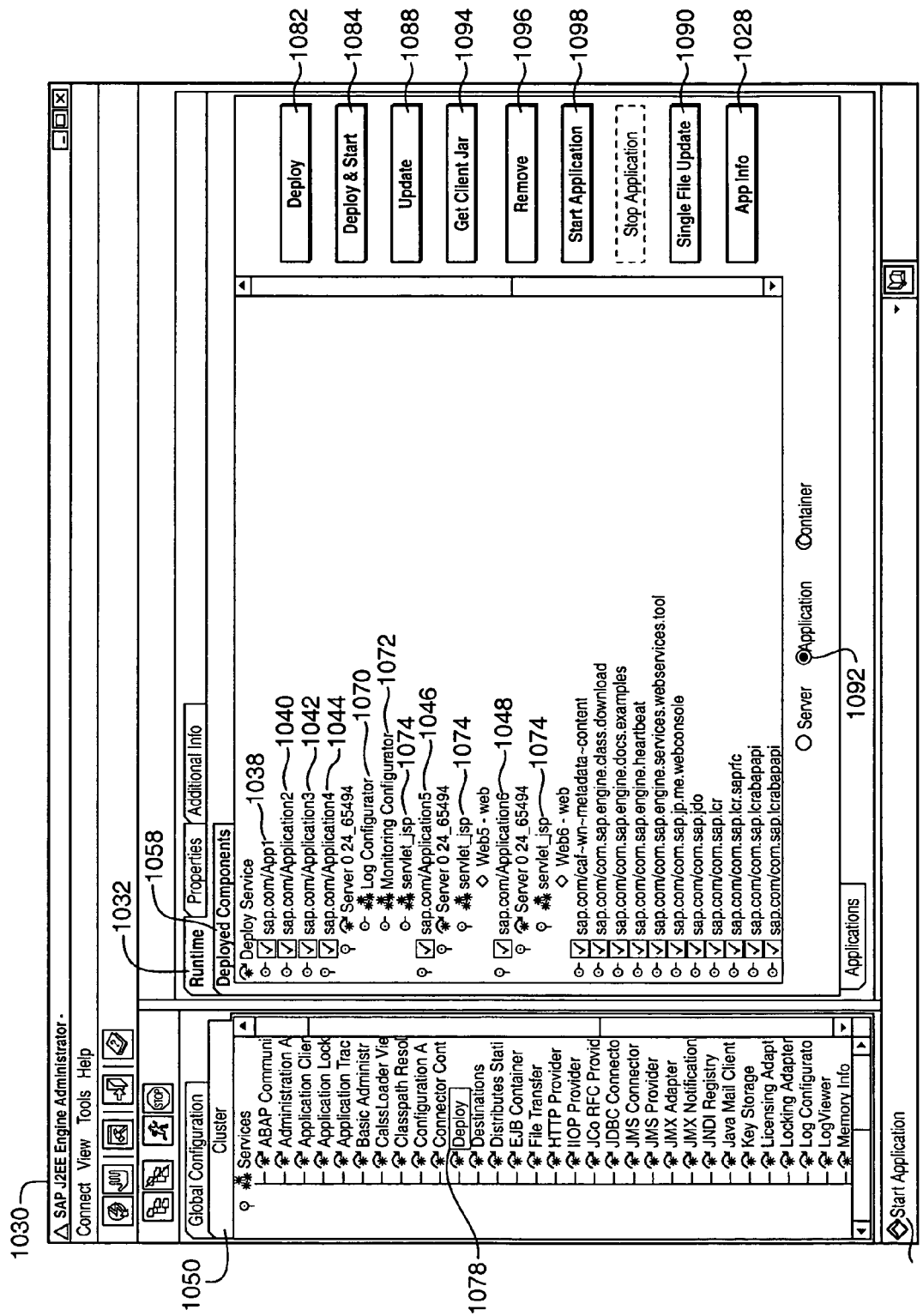
FIG. 10H is an exemplary illustration of an embodiment of an administrator tool viewer.

FIG. 10H is an exemplary illustration of an embodiment of an administrator tool viewer 1030. In the illustrated embodiment, Application4 1044 is illustrated having modules and components 1070-1074 and missing modules and containers 1062-1068 and 1076, in comparison with Application1 1060. Application5 1046 and Application6 1048 are shown to have servlet_jsp 1074 and other modules and containers 1062-

1072 and 1076 have been deleted, in comparison with Application1 1060. In this embodiment, one side of the administrator tool viewer 1030 provides additional options, such as get client jar 1094, remove 1096, start application 1098 and app info 1028.

Figure 10I:
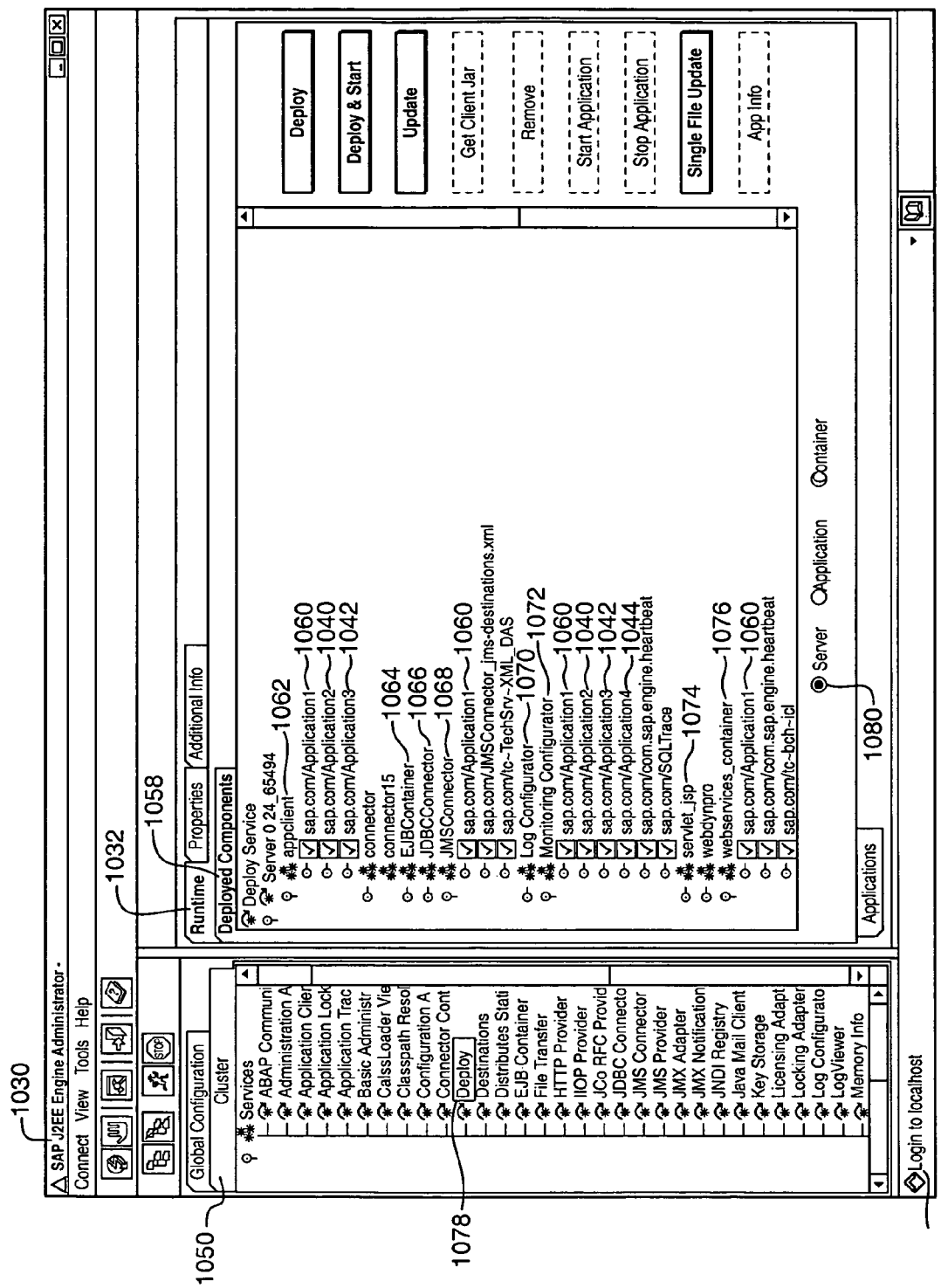
FIG. 10I is an exemplary illustration of an embodiment of an administrator tool viewer.

FIG. 10I is an exemplary illustration of an embodiment of an administrator tool viewer 1030. In this embodiment, the option of server 1080, instead of application 1092, is chosen. Appclient 1062 is shown to be associated with Applications1-3 1060 and 1040-1042. JMSConnector 1068 is shown to be associated with Application1 1060. Monitoring Configurator 1072 is shown to be associated with Applications1-4 1060 and 1040-1044. Webservices_container 1076 is illustrated as being associated with Application1 1060.

Figure 11:
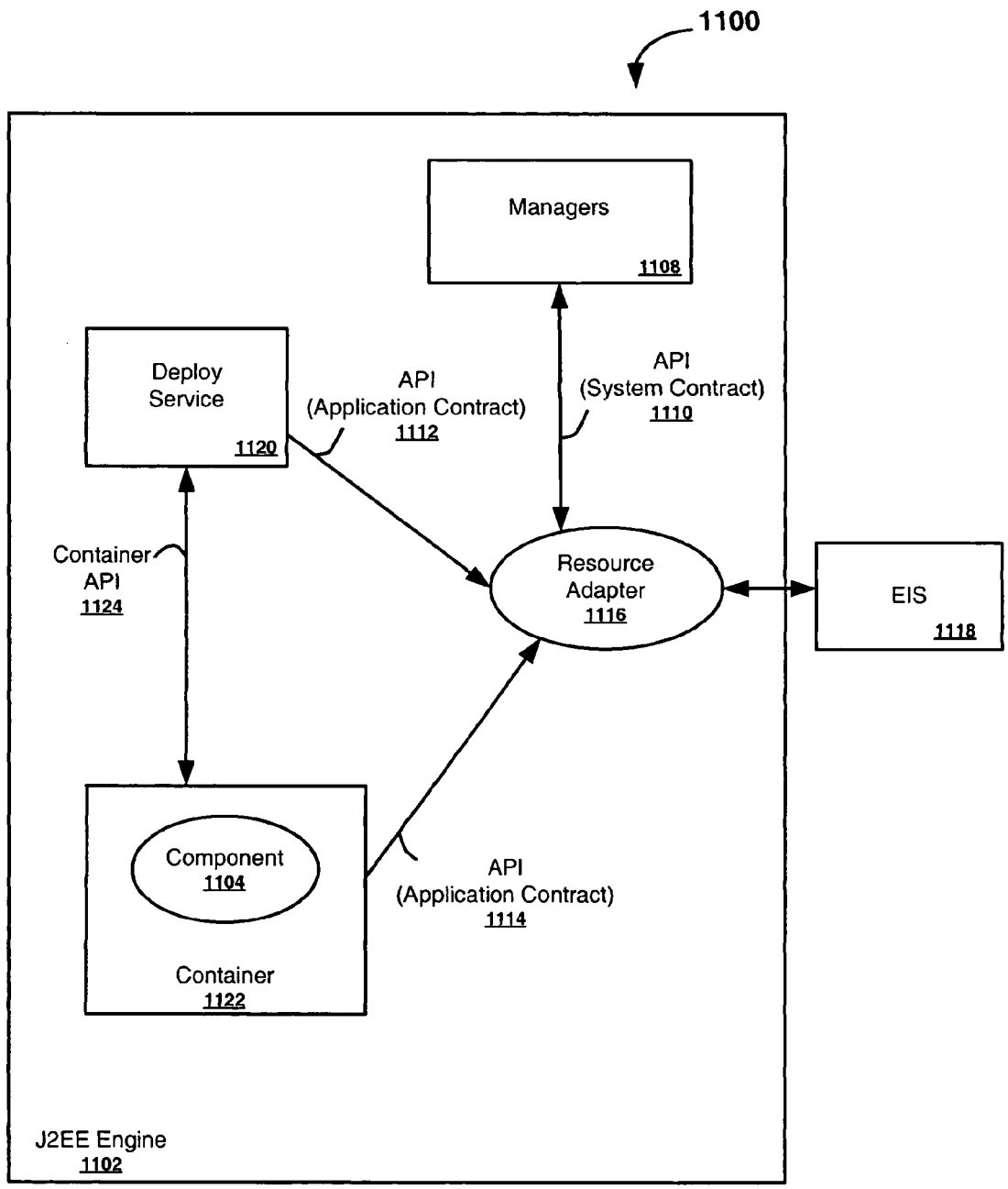
FIG. 11 is a block diagram illustrating an embodiment of a J2EE connector architecture including a deploy service.

FIG. 11 is a block diagram illustrating an embodiment of a J2EE connector architecture 1100 including a deploy service 1120. In the illustrated embodiment, the J2EE architecture 1100 enables application components 1104, including J2EE and non-J2EE components, to interact with an enterprise information system (EIS) 1118. Similarly, the J2EE and non-J2EE applications communicate with the EIS 1118 via the resource adapter 1116. The EIS software associated with the EIS 1118 may include various systems, enterprise resource planning (ERP), mainframe transaction processing, and databases. The EIS 1118 includes back-end database or data management components that run on the database server. The EIS 1118 may include persistent storages or databases, database servers, EJB servers, old systems, mySAP components, and the like. It is contemplated, not all components 1104 are required to have access to the EIS 1118.

As illustrated, the J2EE connector architecture 1100 includes a resource adapter 1116, also referred to as a component, to provide connectivity to a specific EIS or EIS system 1118. The resource adapters 1116 are provided by various EIS vendors. The J2EE connector architecture 1100 may also include various J2EE or non-J2EE products to allow the resources adapter 1116 to be plugged in to the platform implementation. A resource adapter 1116 may be stored in a RAR file and deployed on a J2EE server, similar to an EAR file of a J2EE application. Also, the RAR file may be contained in an EAR file or it may exist as a separate file.

According to one embodiment, a deploy service 1120 communicates with various containers 1122, each having application components 1104, via a container API 1124. The deploy service 1120 facilitates the management of the container 1122 and of the application assembled using the application component 1104. The deploy service 1120 and the container 1122 communicate with the resource adapter 1116 via application contracts or APIs 1112-1114. The resource adapter 1116 is then used by the deploy service 1120 and the container 1122 to communicate with the EIS 1118. Similarly, the mangers or services 1118 are linked with the resource adapter 1116 via an API or services contract 1110 to link the EIS 1108 with various services, such as security, transaction, and connectivity, managed by the server. The APIs 1110-1114 are implemented by the resource adapter 1116.

Figure 12:
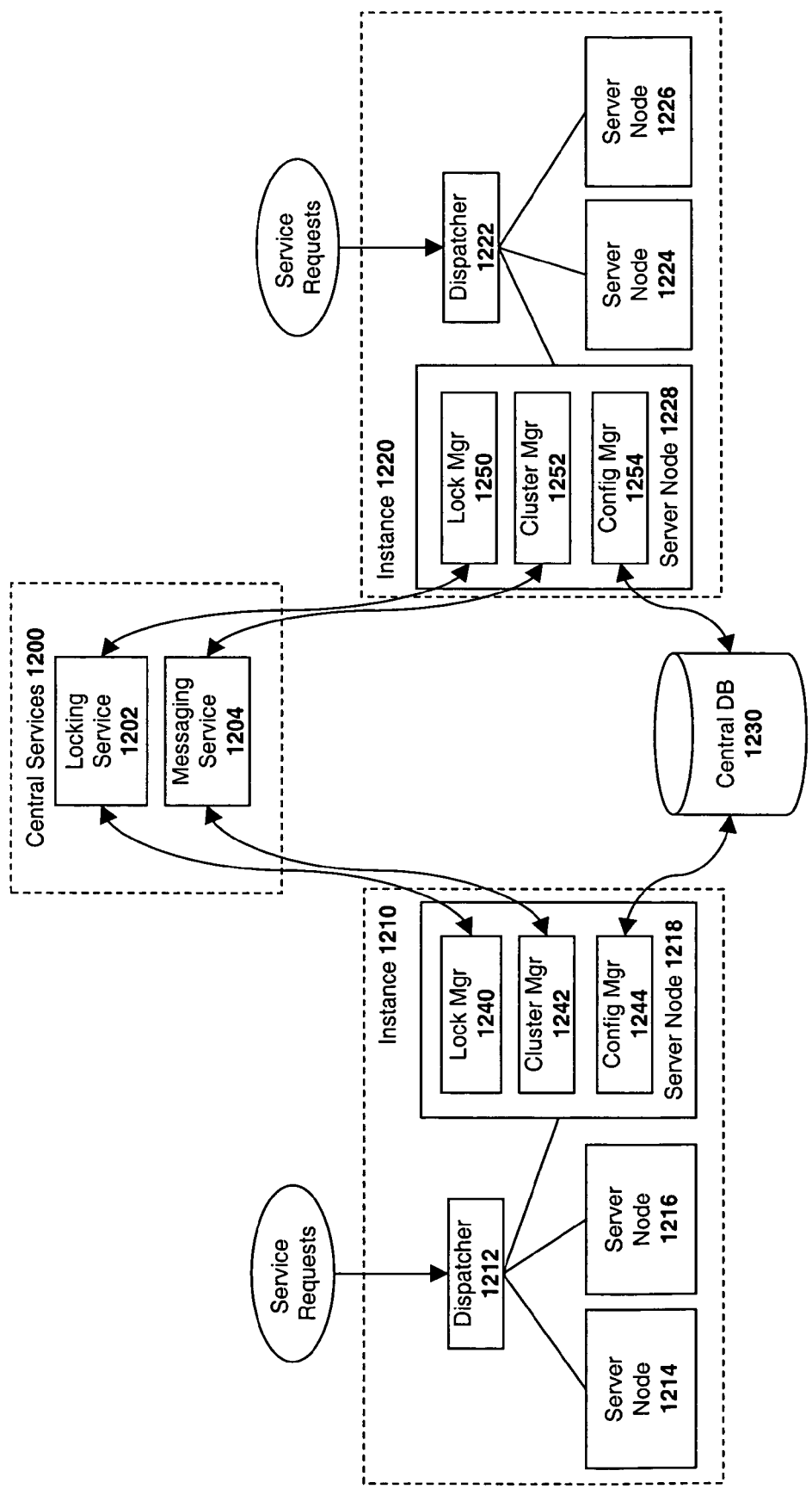
FIG. 12 is a block diagram illustrating an embodiment of a server node system architecture.

A system architecture according to one embodiment of the invention is illustrated in FIG. 12. The architecture includes a central services instance 1200 and a plurality of application server instances 1210, 1220. As used herein, the application server instances, 1210 and 1220, each include a group of server nodes 1214, 1216, 1218 and 1224, 1226, 1228, respectively, and a dispatcher, 1212, 1222, respectively. The central services instance 1200 includes a locking service 1202 and a messaging service 1204 (described below). The combination of all of the application server instances 1210, 1220 and the central services instance 1200 is referred to herein as a "cluster." Although the following description will focus solely on instance 1210 for the purpose of explanation, the same principles apply to other instances such as instance 1220.

The server nodes 1214, 1216, 1218 within instance 1210 provide the business and/or presentation logic for the network applications supported by the system. Each of the server nodes 1214, 1216, 1218 within a particular instance 1210 may be configured with a redundant set of application logic and associated data. In one embodiment, the dispatcher 1210 distributes service requests from clients to one or more of the server nodes 1214, 1216, 1218 based on the load on each of the servers. For example, in one embodiment, the dispatcher 1210 implements a round-robin policy of distributing service requests.

The server nodes 1214, 1216, 1218 may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft.NET platforms and/or the Advanced Business Application Programming ("ABAP") platforms developed by SAP AG, the assignee of the present application.

In one embodiment, communication and synchronization between each of the instances 1210, 1220 is enabled via the central services instance 1200. As illustrated in FIG. 12, the central services instance 1200 includes a messaging service 1204 and a locking service 1202. The message service 1204 allows each of the servers within each of the instances to communicate with one another via a message passing protocol. For example, messages from one server may be broadcast to all other servers within the cluster via the messaging service 1204 (e.g., such as the cache configuration messages described below). Alternatively, messages may be addressed directly to specific servers within the cluster (i.e., rather than being broadcast to all servers).

In one embodiment, the locking service 1202 disables access to (i.e., locks) certain specified portions of configuration data and/or program code stored within a central database 1230 or resources shared in the cluster by different services. The locking manager locks data on behalf of various system components which need to synchronize access to specific types of data and program code (e.g., such as the configuration managers 1244, 1254). As described in detail below, the locking service enables a distributed caching architecture for caching copies of server/dispatcher configuration data.

In one embodiment, the messaging service 1204 and the locking service 1202 are each implemented on dedicated servers. However, the messaging service 1204 and the locking service 1202 may be implemented on a single server or across multiple servers while still complying with the underlying principles of the invention.

As illustrated in FIG. 12, each server node (e.g., 1218, 1228) includes a lock manager 1240, 1250 for communicating with the locking service 1202; a cluster manager 1242, 1252 for communicating with the messaging service 1204; and a configuration manager 1244, 1254 for communicating with a central database 1230 (e.g., to store/retrieve configuration data as described herein). Although the lock manager 1240, 1250, cluster manager 1242, 1252 and configuration manager 1244, 1254 are illustrated only with respect to server nodes 1218 and 1228 in FIG. 12, each of the server nodes 1214, 1216, 1224 and 1226 and/or on the dispatchers 1212, 1222 may be equipped with equivalent lock managers, cluster managers and configuration managers while still complying with the underlying principles of the invention.

Figure 13:
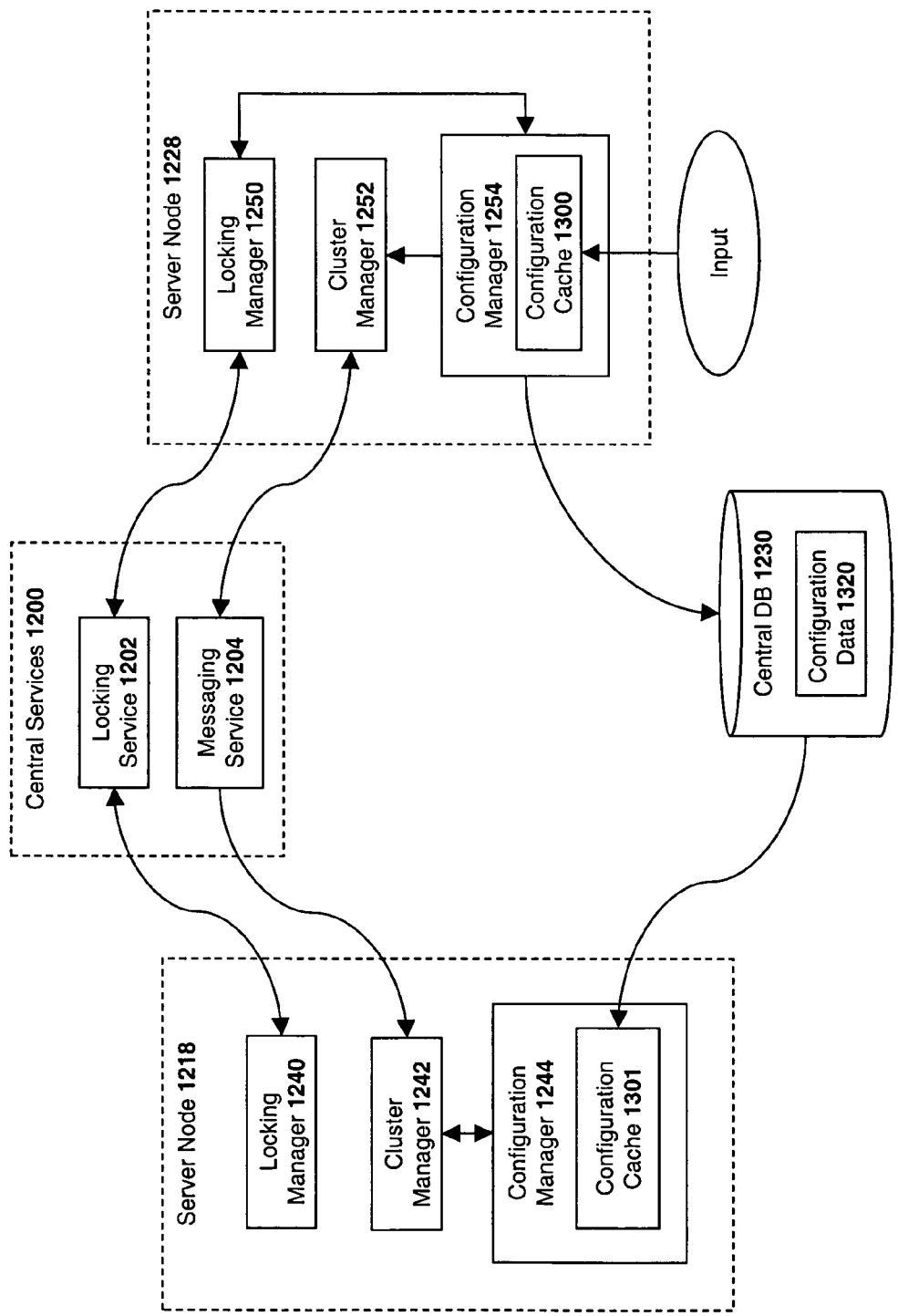
FIG. 13 is a block diagram illustrating an embodiment of a server node architecture which employs a configuration data caching.

Referring now to FIG. 13, in one embodiment, configuration data 1320 defining the configuration of the central services instance 1200 and/or the server nodes and dispatchers within instances 1210 and 1220, is stored within the central database 1230. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1244, 1254 cache configuration data locally within configuration caches 1300, 1301. As such, to ensure that the configuration data within the configuration caches 1300, 1301 remains up-to-date, the configuration managers 1244, 1254 implement cache synchronization policies, as described herein.

Figure 14:
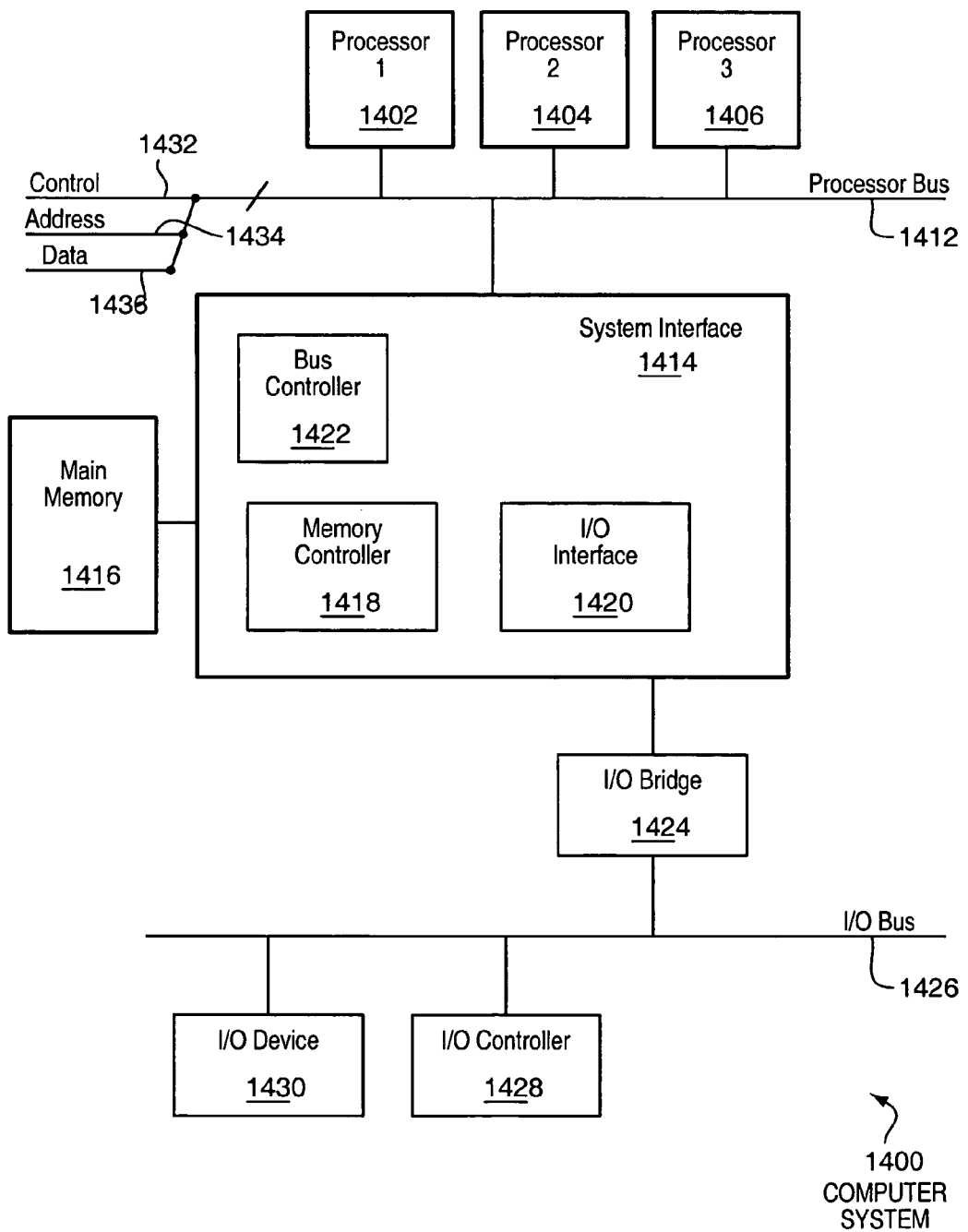
FIG. 14 is an exemplary computer system used in implementing an embodiment of the present invention.

FIG. 14 is an exemplary computer system 1400 used in implementing an embodiment of the present invention. The computer system (system) 1400 includes one or more processors 1402-1406. The processors 1402-1406 may include one or more single-threaded or multi-threaded processors. A typical multi-threaded processor may include multiple threads or logical processors, and may be capable of processing multiple instruction sequences concurrently using its multiple threads. Processors 1402-1406 may also include one or more internal levels of cache (not shown) and a bus controller or bus interface unit to direct interaction with the processor bus 1412.

Processor bus 1412, also known as the host bus or the front side bus, may be used to couple the processors 1402-1406 with the system interface 1414. Processor bus 1412 may include a control bus 1432, an address bus 1434, and a data bus 1436. The control bus 1432, the address bus 1434, and the data bus 1436 may be multidrop bi-directional buses, e.g., connected to three or more bus agents, as opposed to a point-to-point bus, which may be connected only between two bus agents.

System interface 1414 (or chipset) may be connected to the processor bus 1412 to interface other components of the system 1400 with the processor bus 1412. For example, system interface 1414 may include a memory controller 1418 for interfacing a main memory 1416 with the processor bus 1412. The main memory 1416 typically includes one or more memory cards and a control circuit (not shown). System interface 1414 may also include an input/output (I/O) interface 1420 to interface one or more I/O bridges or I/O devices with the processor bus 1412. For example, as illustrated, the I/O interface 1420 may interface an I/O bridge 1424 with the processor bus 1412. I/O bridge 1424 may operate as a bus bridge to interface between the system interface 1414 and an I/O bus 1426. One or more I/O controllers and/or I/O devices may be connected with the I/O bus 1426, such as I/O controller 1428 and I/O device 1430, as illustrated. I/O bus 1426 may include a peripheral component interconnect (PCI) bus or other type of I/O bus.

System 1400 may include a dynamic storage device, referred to as main memory 1416, or a RAM or other devices coupled to the processor bus 1412 for storing information and instructions to be executed by the processors 1402-1406. Main memory 1416 also may be used for storing temporary variables or other intermediate information during execution of instructions by the processors 1402-1406. System 1400 may include a ROM and/or other static storage device coupled to the I/O bus 1426 for storing static information and instructions for the processors 1402-1406.

Main memory 1416 or dynamic storage device may include a magnetic disk or an optical disc for storing information and instructions. I/O device 1430 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1430 may also include an input device (not shown), such as an alphanumeric input device, including alphanumeric and other keys for communicating information and/or command selections to the processors 1402-1406. Another type of user input device includes cursor control, such as a mouse, a trackball, or cursor direction keys for communicating direction information and command selections to the processors 1402-1406 and for controlling cursor movement on the display device.

System 1400 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1400 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 1400 may vary from implementation to implementation depending upon numerous factors, such as price constraints, performance requirements, technological improvements, and/or other circumstances.

It should be noted that, while the embodiments described herein may be performed under the control of a programmed processor, such as processors 1402-1406, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 15:
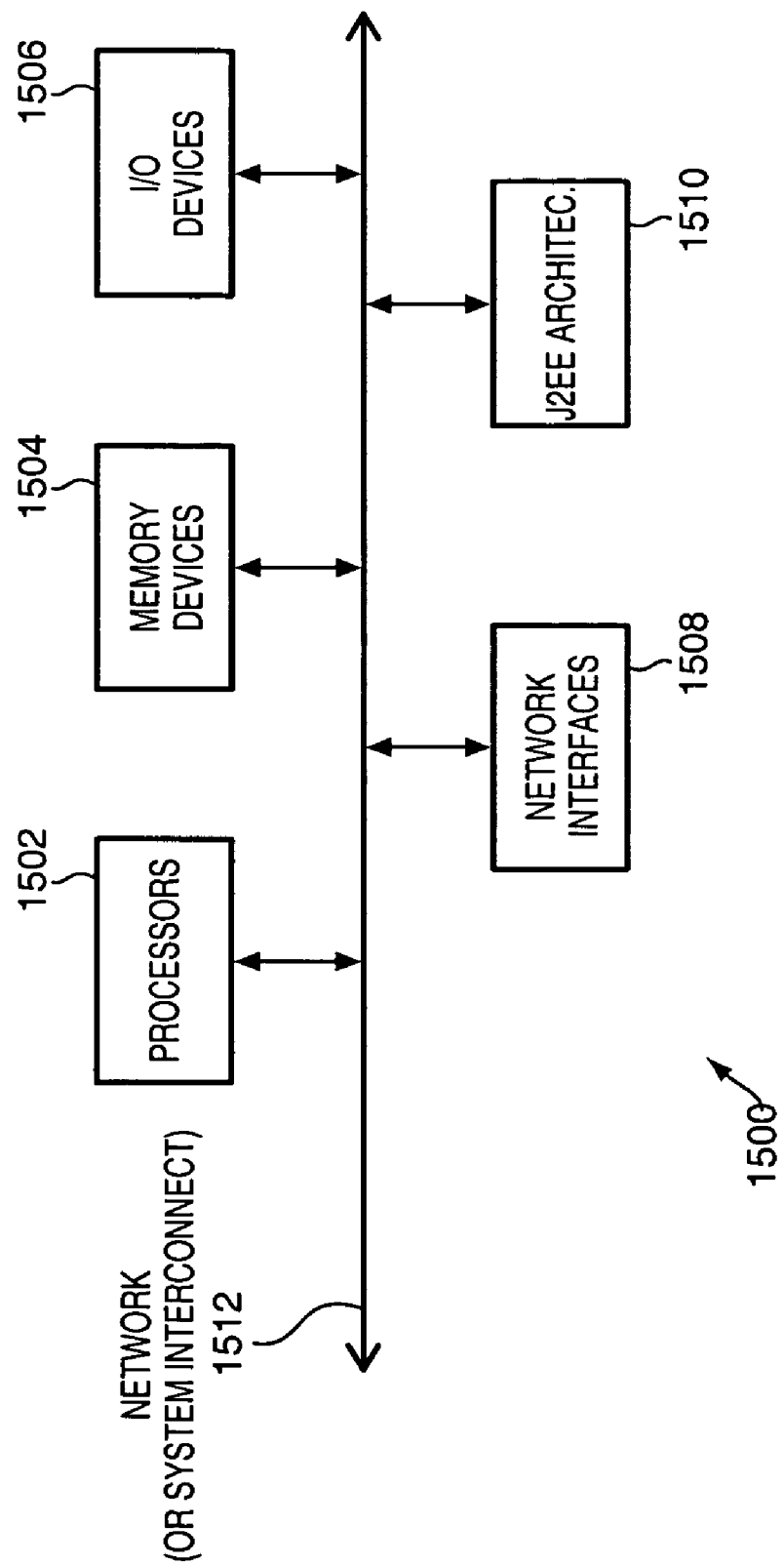
FIG. 15 is a block diagram illustrating an embodiment of a node implementation in a network.

FIG. 15 is a block diagram illustrating an embodiment of a node 1500 implementation. According to one embodiment, the node 1500 may include one or more processors 1502 (e.g., processors 1402-1406 of FIG. 14), one or more memory devices 1504 (e.g., main memory 1416 of FIG. 14), one or more Input/Output (I/O) devices 1506 (e.g., I/O devices 1430 of FIG. 14), one or more network interfaces 1508, and J2EE architecture 1510, directly or indirectly, connected together and in communication through a system or network interconnect 1512. The processors 1502 may include microprocessors, microcontrollers, FPGAs, ASICs, central processing units (CPUs), programmable logic devices (PLDs), and similar devices that access instructions from a system storage (e.g., memory 1504), decode them, and execute those instructions by performing arithmetic and logical operations.

The J2EE architecture 1510 may include a deploy system for application cloning based on various J2EE and non-J2EE containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1510 may include executable content, it may be stored in the memory device 1504 and executed by the control processor 1502.

Memory devices 1504 may encompass a wide variety of memory devices including ROM, EPROM, EEPROM, random access memory (RAM), non-volatile random access memory (NVRAM), cache memory, flash memory, and other memory devices. Memory devices 1504 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1504 may store program modules, such as routines, programs, objects, images, data structures, program data, and other program modules that perform particular tasks or implement particular abstract data types that facilitate system use.

The I/O devices 1506 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1512 may permit communication between the various elements of node 1500. System interconnects 1512 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:

cloning a first software application deployed at a Web application server into a second software application at the Web application server;

associating a second name to the second software application that is different from a first name associated with the first software application such that the second software application is distinguished from the first software application at the Web application server;

during runtime, simultaneously processing the first software application and the second software application at the Web application server, wherein processing includes simultaneously running a performance test on the first and second software applications, wherein running the performance test includes measuring first components of the first software application and second components of the second software application, compiling a result based on the measurement of the first and second components and an estimation of future changes to the second software application, and amending the second software application based on the result; and after completing the performance test, replacing the first software application with the amended second software application on the Web application server by overwriting the first software application with the amended second software application, and communicating the replacement to Web application servers coupled with the Web application server.

2. The method of claim 1, wherein the amending of the second software application comprises adding, removing, or modifying of one or more of elements, components, modules, classes, and descriptive information corresponding to the second software application.

3. The method of claim 1, further comprising after completing the performance test, updating the first software application based on the amended second software application, and temporarily storing the amended second software application for subsequent simultaneous processing of the updated first software application and the amended second software application, wherein subsequent simultaneous processing includes running performance tests on the updated first software application and the amended second software application.

4. The method of claim 1, further comprising after completing the performance test, storing the amended second software application at the Web application server or another Web application server to serve as a back up to the first software application.

5. The method of claim 1, further comprising associating one or more second Web aliases to each of one or more second Web modules of the second software application, the one or more second Web aliases being different from one or more first Web aliases associated with one or more first Web modules of the first software application to distinguish the second software application from the first software application at the Web application server.

6. A system comprising:

an application cloning system having a first software application deployed a Web application server, the application cloning system to clone the first software application deployed at the Web application server into a second software application;

associate a second name to the second software application that is different from a first name associated with the first software application such that the second software application is distinguished from the first software application at the Web application server;

during runtime, simultaneously process the first software application and the second software application on the Web application server, wherein processing includes simultaneously running a performance test on the first and second software applications, wherein running performance test includes measuring first components of the first software application and second components of the second software application, compiling a result based on the measurement of the first and second components and an estimation of future changes to the second software application, and amending the second software application based on the result; and after completing the performance test, replace the first software application with the amended second software application on the Web application server by overwriting the first software application with the amended second software application and communicate the replacement to Web application servers coupled with the Web application server.

7. The system of claim 6, wherein the Web application server resides at server computer system coupled with a plurality of server computer systems via a network.

8. The system of claim 6, wherein the first software application comprises a Java-based software application associated with a Java 2Enterprise Edition (J2EE) engine or an Advanced Business Application Programming (ABAP)-based software application associated with an ABAP engine.

9. The system of claim 6, wherein the application cloning system is further to after completing the performance test, update the first software application based on the amended second software application, and temporarily store the amended second software application for subsequent simultaneous processing of the updated first software application and the amended second software application, wherein subsequent simultaneous processing includes running performance tests on the updated first software application and the amended second software application.

10. The system of claim 6, wherein the application cloning system is further to after completing the performance test, store the amended second software application at the Web application server or another Web application server to serve as a back up to the first software application.

11. The system of claim 6, wherein the application cloning system is further to associate one or more second Web aliases to each of one or more second Web modules of the second software application, the one or more second Web aliases being different from one or more first Web aliases associated with one or more first Web modules of the first software application to distinguish the second software application from the first software application at the Web application server.

12. A machine-readable storage medium comprising instructions which, when executed, cause a machine to:

clone a first software application deployed at a Web application server into a second software application at the Web application server;

associate a second name to the second software application that is different from a first name associated with the first software application such that the second software application is distinguished from the first software application at the Web application server;

in runtime, simultaneously process the first software application and the second software application at the Web application server, wherein processing includes simultaneously running a performance test on the first and second software applications, wherein running performance test includes measuring first components of the first software application and second components of the second software application, compiling a result based on the measurement of the first and second components and an estimation of future changes to the second software application, and amending the second software application based on the result; and after completing the performance test, replace the first software application with the amended second software application on the Web application server by overwriting the first software application with the amended second software application, and communicate the replacement to Web application servers coupled with the Web application server.

13. The machine-readable storage medium of claim 12, wherein the amending of the second software application comprises adding, removing, or modifying of one or more of elements, components, modules, classes, and descriptive information corresponding to the second application.

14. The machine-readable storage medium of claim 12, wherein the instructions that when executed, further cause the machine to after completing the performance test, update the first software application based on the amended second software application, and temporarily store the amended second software application for subsequent simultaneous processing of the updated first software application and the amended second software application, wherein subsequent simultaneous processing includes running performance tests on the updated first software application and the amended second software application.

15. The machine-readable storage medium of claim 12, wherein the instructions that when executed, further cause the machine to after completing the performance test, store the amended second software application at the Web application server or another Web application server to serve as a back up to the first software application.

16. The machine-readable storage medium of claim 12, wherein the instructions that when executed, further cause the machine to associate one or more second Web aliases to each of one or more second Web modules of the second software application, the one or more second Web aliases being different from one or more first Web aliases associated with one or more first Web modules of the first software application to distinguish the second software application from the first software application at the Web application server.

* * * * *